US012158034B2

(12) United States Patent
Gabel et al.

(10) Patent No.: US 12,158,034 B2
(45) Date of Patent: Dec. 3, 2024

(54) FURNITURE DRIVE FOR MOVING A FURNITURE PART THAT IS MOUNTED MOVABLY RELATIVE TO A FURNITURE BODY

(71) Applicant: Julius Blum GmbH, Hoechst (AT)

(72) Inventors: Peter Gabel, Meiningen (AT); Marcel Schneider, Moeggers (AT)

(73) Assignee: JULIUS BLUM GMBH, Hoechst (AT)

( * ) Notice: Subject to any disclaimer, the term of this patent is extended or adjusted under 35 U.S.C. 154(b) by 0 days.

(21) Appl. No.: 17/969,308

(22) Filed: Oct. 19, 2022

(65) Prior Publication Data

US 2023/0045499 A1 Feb. 9, 2023

Related U.S. Application Data

(63) Continuation of application No. PCT/AT2021/060110, filed on Mar. 31, 2021.

(30) Foreign Application Priority Data

Apr. 20, 2020 (AT) .............................. A 50340/2020

(51) Int. Cl.
*E05F 1/10* (2006.01)
*E05D 3/16* (2006.01)
(Continued)

(52) U.S. Cl.
CPC ................ *E05F 1/105* (2013.01); *E05D 3/16* (2013.01); *E05F 1/1261* (2013.01); (Continued)

(58) Field of Classification Search
CPC ....... E05F 1/105; E05F 1/1261; E05F 1/1276; E05D 2003/163; E05D 3/16; E05D 15/40; (Continued)

(56) References Cited

U.S. PATENT DOCUMENTS 4,590,639 A * 5/1986 Fritsche .................... E05F 3/10 16/DIG. 39
4,783,882 A * 11/1988 Frolov ...................... E05F 3/22 16/72
(Continued)

FOREIGN PATENT DOCUMENTS

DE 20 2010 005 934 9/2010
DE 10 2011 077 990 12/2012
(Continued)

OTHER PUBLICATIONS

International Search Report issued Jun. 11, 2021 in International (PCT) Application No. PCT/AT2021/060110.

*Primary Examiner* — Jeffrey O'Brien
(74) *Attorney, Agent, or Firm* — Wenderoth, Lind & Ponack, L.L.P.

(57) ABSTRACT

A furniture drive for moving a furniture part includes a housing to be located on or in a furniture panel, and an actuating arm mounted movably relative to the housing and on which the movable furniture part can be fastened, and the housing has an end face through which the actuating arm protrudes in a relative position. A spring can exert a force onto the actuating arm, an adjustment bar can adjust the force that can be exerted onto the actuating arm by the spring, and a display can display the force adjustment carried out by the adjustment bar. The display is formed separately from the adjustment bar and can be read in an installed position of the furniture drive, in which position the housing is located completely, except for the end face, in the furniture panel of the furniture body.

15 Claims, 30 Drawing Sheets

(51) Int. Cl.
*E05F 1/12* (2006.01)
*E05D 7/04* (2006.01)

(52) U.S. Cl.
CPC . *E05D 2007/0476* (2013.01); *E05Y 2201/499* (2024.05); *E05Y 2900/20* (2013.01)

(58) Field of Classification Search
CPC ... E05D 7/0009; E05D 7/0045; E05D 7/0415; E05D 7/0423; E05D 2007/0476; E05D 2007/0484
See application file for complete search history.

(56) References Cited

U.S. PATENT DOCUMENTS

| | | | | |
|---|---|---|---|---|
| 6,282,750 | B1 * | 9/2001 | Bishop | E05F 3/102<br>16/72 |
| 9,498,062 | B2 * | 11/2016 | Baldreich | A47B 96/00 |
| 9,695,620 | B2 * | 7/2017 | Zasowski | E05F 1/105 |
| 10,180,023 | B2 * | 1/2019 | Zasowski | E05F 1/105 |
| 11,060,337 | B2 | 7/2021 | Sobolewski et al. | |
| 11,248,406 | B2 * | 2/2022 | Nordieker | E05D 3/16 |
| 11,319,739 | B2 | 5/2022 | Yasuda et al. | |
| 11,525,295 | B2 * | 12/2022 | Nordieker | E05F 3/20 |
| 11,808,074 | B2 * | 11/2023 | Hirtsiefer | E05D 7/125 |
| 2015/0351539 | A1 | 12/2015 | Baldreich et al. | |
| 2020/0123827 | A1 | 4/2020 | Sobolewski et al. | |
| 2021/0010311 | A1 * | 1/2021 | Nordieker | E05F 1/1058 |
| 2021/0262271 | A1 | 8/2021 | Yasuda et al. | |
| 2022/0074248 | A1 * | 3/2022 | Holzapfel | E05D 5/0276 |
| 2022/0251890 | A1 * | 8/2022 | Hirtsiefer | E05D 7/125 |
| 2023/0030015 | A1 * | 2/2023 | Boesch | E05D 15/40 |
| 2023/0272649 | A1 * | 8/2023 | Baldreich | E05D 3/06<br>312/325 |

FOREIGN PATENT DOCUMENTS

| | | | |
|---|---|---|---|
| DE | 20 2012 009 218 | 3/2013 | |
| DE | 102017126368 A1 * | 5/2019 | E05D 3/16 |
| DE | 21 2017 000 269 | 8/2019 | |
| WO | 2014/121309 | 8/2014 | |
| WO | 2018/192819 | 10/2018 | |
| WO | 2020/003790 | 1/2020 | |

* cited by examiner

FURNITURE DRIVE FOR MOVING A FURNITURE PART THAT IS MOUNTED MOVABLY RELATIVE TO A FURNITURE BODY

BACKGROUND OF THE INVENTION

The invention relates to a furniture drive for moving a furniture part that is mounted movably relative to a furniture body, in particular a furniture flap that is pivotable about a horizontal axis relative to the furniture body. The furniture flap includes:

- a housing to be arranged on or in a furniture panel of the furniture body,
- at least one actuating arm mounted movably relative to the housing and on which the movable furniture part can be fastened, wherein the housing has an end face through which the at least one actuating arm protrudes in at least one relative position,
- at least one spring with which a force can be exerted on the at least one actuating arm,
- at least one adjustment bar for adjusting the force that can be exerted on the at least one actuating arm by the at least one spring, and
- at least one display with which a force adjustment that can be carried out by means of the at least one adjustment bar can be displayed.

Furthermore, the invention relates to a piece of furniture with a furniture body and at least one furniture part mounted movably relative to the furniture body, preferably at least one furniture flap that is pivotable about a horizontal axis relative to the furniture body in a position of use of the piece of furniture.

Such a furniture drive is already known from the specification DE 20 2010 005 934 U1, in which a force adjustment of an actuating arm can be read via an opening in a housing. Here, the opening is arranged on a side face of the housing. The force adjustment can be manipulated via an adjustment bar. The furniture drive is arranged on an inside of a furniture panel of a furniture body of a piece of furniture.

A disadvantage of the state of the art is that an installer and/or operator of the furniture drive cannot generate any information at all about a force adjustment when using the furniture drive inside the furniture panel of the furniture body. Furthermore, it is not possible for the installer and/or operator of the furniture drive to determine or rather read the altered force adjustment when the force adjustment is altered. An adjustment of the force adjustment cannot thereby be guaranteed to a sufficient degree, which results in reduced convenience in operating the furniture drive and/or the piece of furniture. A precise adjustment of the force adjustment is thereby not guaranteed in an installed position of the furniture drive in the piece of furniture. However, locating a furniture drive exposed, outside of the furniture panel, on the one hand reduces the storage space of the piece of furniture and on the other hand impairs the aesthetic appearance of the furniture body.

SUMMARY OF THE INVENTION

The objective technical problem of the present invention is therefore to specify a furniture drive that is improved compared with the state of the art and a piece of furniture with at least one such furniture drive, in which the disadvantages of the state of the art are at least partially rectified, and which are characterized in particular by a precise, determinable force adjustment of the at least one actuating arm in an installed position of the furniture drive in the piece of furniture.

Thus, according to the invention, the at least one display is formed separately from the at least one adjustment bar and can be read in an installed position of the furniture drive, in which the housing is arranged completely, except for the end face, in the furniture panel of the furniture body.

It is thereby made possible for the first time for an operator and/or installer to be able to adjust the force adjustment precisely in the installed position of the furniture drive, wherein it is not necessary to dismantle and re-assemble the furniture drive, since the force adjustment is visible via the at least one display from a viewing direction from the front onto the furniture body.

As stated at the beginning, protection is also sought for a piece of furniture with a furniture body and at least one furniture part that is mounted movably relative to the furniture body, preferably at least one furniture flap that is pivotable about a horizontal axis relative to the furniture body in a position of use of the piece of furniture. The piece of furniture has at least one such furniture drive, and the furniture body has at least one, preferably vertically arranged, furniture panel and the housing of the at least one furniture drive is arranged on or in the furniture panel. The at least one furniture part is fastened or can be fastened on the at least one actuating arm of the at least one furniture drive.

The term "separately" is to be interpreted such that a distinct display component or component assembly can be identified which, although in spatial terms, can possibly be connected indirectly or directly (such as in a material-bonding manner) to the adjustment bar, in functional terms the display serves for the visualization or rather read capability of the force adjustment brought about by the adjustment bar and thus has no functional interaction with the force adjustment per se.

According to an advantageous design of the invention, the at least one display can be read in the installed position of the furniture drive at least in the relative position in which the at least one actuating arm protrudes through the end face of the housing.

It is thereby made possible for the adjustment of the force that can be exerted on the at least one actuating arm by the at least one spring, in the at least one relative position of the at least one actuating arm, to be readable conveniently via the end face of the housing. This is of vital importance for a user-friendly adjustment of the force adjustment.

Advantageously, the at least one display can be arranged at least partially on a region of the at least one actuating arm, preferably within the at least one actuating arm, which is arranged outside the housing in the relative position in which the at least one actuating arm protrudes through the end face of the housing.

It has proved to be advantageous for the at least one actuating arm to have at least one actuating arm opening, wherein the at least one display can be read through the at least one actuating arm opening in the relative position in which the at least one actuating arm protrudes through the end face of the housing.

Through an arrangement of the at least one display on the at least one actuating arm, the at least one display can particularly advantageously protrude beyond the end face of the housing in at least one relative position, wherein it is made easier for the force adjustment to be read by an operator and/or installer and/or an aesthetic appearance of the furniture drive can be improved.

According to an advantageous embodiment of the invention, at least one opening is arranged in the end face of the housing and the at least one display is arranged in the interior of the housing at least in regions and can be read by looking through the at least one opening into the interior of the housing.

Reading the force adjustment in the interior of the housing is made possible through the at least one opening, wherein a compact furniture drive can be guaranteed.

It has proved to be advantageous for the housing to have two side faces spaced apart from one another, which are arranged substantially parallel to one another and in each case transversely relative to the end face of the housing, and wherein the at least one display is arranged between or in a clear width between the two side faces at least in regions.

This has the positive effect that the at least one display is protected from dirt and/or from shavings during an installation in a piece of furniture.

In general, the at least one display can, however, also protrude through the at least one opening into an outer region of the housing.

An advantageous variant consists of the at least one display being arranged at least partially on the at least one adjustment bar, wherein it is preferably provided that the at least one display is arranged on a side of the at least one adjustment bar facing the end face, particularly preferably between the end face and the at least one adjustment bar.

The constructive design of an arrangement of the at least one display on the at least one adjustment bar particularly promotes a coupling of the adjustment of the force, which can be exerted on the at least one actuating arm by the at least one spring, with the force adjustment to be read via the at least one display.

If the at least one display is located between the end face and the at least one adjustment bar, reading the force adjustment via the at least one display in the case of a viewing direction obliquely in relation to the end face is made possible.

It is particularly preferred for the at least one display to comprise at least one scale (measurement symbols) and at least one indicator that is movable relative thereto, preferably wherein the at least one scale is engraved into at least one part of the furniture drive or is glued onto at least one part of the furniture drive.

An operator and/or installer of the furniture drive can see a size of the force adjustment from a position of the at least one indicator relative to the at least one scale.

If the at least one scale is glued on, the at least one scale can be quickly renewed.

In general, the scale can also, for example, be carved into, painted on and/or provided by embossments in the material of the housing.

In an embodiment of the invention, the at least one indicator is movable relative to the at least one scale when the force that can be exerted on the at least one actuating arm by the at least one spring is adjusted and/or the adjustment of the force that can be exerted on the at least one actuating arm by the at least one spring can be read from a position of the at least one indicator relative to the at least one scale.

If, through a force adjustment, in particular in the case of a force adjustment via the at least one adjustment bar, the at least one indicator is moved relative to the at least one scale, a transmission of the adjustment of the force onto the at least one display is made possible in a particularly advantageous manner, wherein an operator and/or installer can see by looking at the at least one display what force is applied to the at least one actuating arm by the at least one spring.

According to a preferred embodiment of the invention, the at least one scale is arranged on at least one, preferably transparent, film, and preferably the housing has at least one housing opening, preferably on at least one possibly present side face, to which the at least one film can be affixed or is affixed, wherein the scale is arranged on a side of the at least one film facing the at least one adjustment bar.

With at least one film, the at least one scale can be affixed to the furniture drive both in a space-saving manner and cost-effectively. If the scale faces in the direction of the side facing the adjustment bar, in the installed position the force adjustment can be read particularly conveniently by looking through the housing opening.

In an advantageous variant of the invention, the measurement symbols include at least one scale arranged on at least one indicator that is movable relative to the housing and at least one marking on at least one part of the furniture drive. The at least one indicator is movable relative to the at least one marking when the force that can be exerted on the at least one actuating arm by the at least one spring is adjusted and/or the adjustment of the force that can be exerted on the at least one actuating arm by the at least one spring can be read from a position of the at least one marking relative to the at least one indicator.

It has proved to be advantageous for the at least one indicator to be in the form of a preferably punched metal sheet or a wire, preferably with a thickening.

If the indicator is formed as a metal sheet, a particularly narrow furniture drive can be provided, wherein a rigid indicator makes a particularly precise display of the force adjustment possible. If the indicator is formed as a wire, a display of the force adjustment can be generated particularly advantageously over long distances, complex geometries and/or in positions of the furniture drive that are difficult to access, wherein a weight of the furniture drive can be kept low.

The material of the at least one indicator is generally as desired. The indicator is particularly preferably formed of metal or plastic.

Furthermore, preferably the at least one indicator is substantially movable in a translational manner or rotatable.

According to an advantageous design of the invention, the at least one adjustment bar comprises a readjustment bar, preferably in the form of a tool holder, wherein the adjustment of the force that can be exerted on the at least one actuating arm by the at least one spring is adjustable via the readjustment bar.

Through the at least one adjustment bar, the force adjustment can be adjusted using a commercially available screwdriver and/or Allen key, for example.

In a further embodiment, the at least one display comprises at least one catching means, wherein the at least one catching means can catch or is caught in at least one receiver. Preferably, the at least one display comprises a transmission via which an adjustment of the force that can be exerted on the at least one actuating arm by the at least one spring by means of the at least one adjustment bar can be transmitted with a transmission ratio, particularly preferably with a transmission ratio of at least 2:1.

By the term "to catch" is meant in this context an arrangement of the catch in or on the receiver.

In the case of an adjustment of the force adjustment, the at least one catch can catch in the at least one receiver, as a result of which the at least one indicator can be moved, in particular by a rotational movement, along the at least one scale. A separate film, on which the scale is arranged, is thereby not needed as the at least one scale and the at least one indicator can be arranged on the at least one adjustment bar.

Through a transmission, the display device can be designed compactly, in particular in the case of large adjustment ranges of the force adjustment.

According to a preferred embodiment of the invention, the housing comprises at least one side face, preferably turned towards (facing) the interior of the furniture drive. At least one part of the at least one display is arranged on the at least one side face that is preferably turned towards the interior of the furniture drive.

According to an advantageous design of the invention, the at least one part of the at least one display is present in the form of at least one scale and/or at least one marking. Preferably, the at least one display comprises at least one indicator that is movable relative to the at least one scale and/or the at least one marking, and is preferably arranged between two side faces that are turned towards the interior of the furniture drive.

Because of the arrangement of the at least one scale and/or marking on the side face, a user of the furniture drive can read the force adjustment of the at least one adjustment bar via the at least one display device particularly advantageously from the front side of the furniture drive because of a larger viewing angle (which is limited in particular in the case of narrow furniture drives). This can be realized particularly advantageously, for example via an indicator arranged between two side faces.

For example, the at least one scale and/or the at least one marking can be arranged via a film on the side face that is turned towards the interior of the furniture drive. Particularly preferably, the scale is arranged via a film on the side face that is turned towards the exterior of the furniture drive. The at least one scale is oriented in the direction of the interior of the furniture drive—in this context, the side face that is turned towards the interior is to be designed so wide that the side face that is turned towards the interior can be formed, for example, by a metal surface of the housing and the film (cf. FIG. 7*c*).

Analogously to a scale arranged on the side face, the kinematically inverse embodiment is also possible (cf. FIG. 5*b*), and the at least one scale is arranged on at least one indicator arranged between the two side faces of the housing. The at least one indicator is movable relative to at least one marking, and the at least one marking is arranged on at least one part of the furniture drive and/or on the at least one side face that is preferably turned towards the interior of the furniture drive.

The at least one marking and/or the at least one scale can generally be painted on, glued on, engraved in or formed by embossments etc.

It is particularly preferred that the at least one furniture part is movable relative to the furniture body by the at least one furniture drive.

This makes an opening and/or closing of the furniture part possible, wherein in particular a bidirectional movement of the furniture part relative to the furniture body is particularly preferred.

According to a preferred embodiment of the invention, the housing of the at least one furniture drive is arranged completely, except for the end face, in the at least one furniture panel of the furniture body.

In the state of the art, the furniture drive is arranged on the furniture panel during the installation of the furniture drive on the piece of furniture. More storage space and/or a more compact and more aesthetic piece of furniture is provided by furniture drives integrated into the at least one furniture panel, wherein reading the force adjustment even in the installed position of the furniture drives within the at least one furniture panel is guaranteed in at least one relative position of the at least one actuating arm.

BRIEF DESCRIPTION OF THE DRAWINGS

Further details and advantages of the present invention are explained in more detail below by means of the description of the figures with reference to the embodiments represented in the drawings, in which.

DETAILED DESCRIPTION OF THE INVENTION

Figure 1:
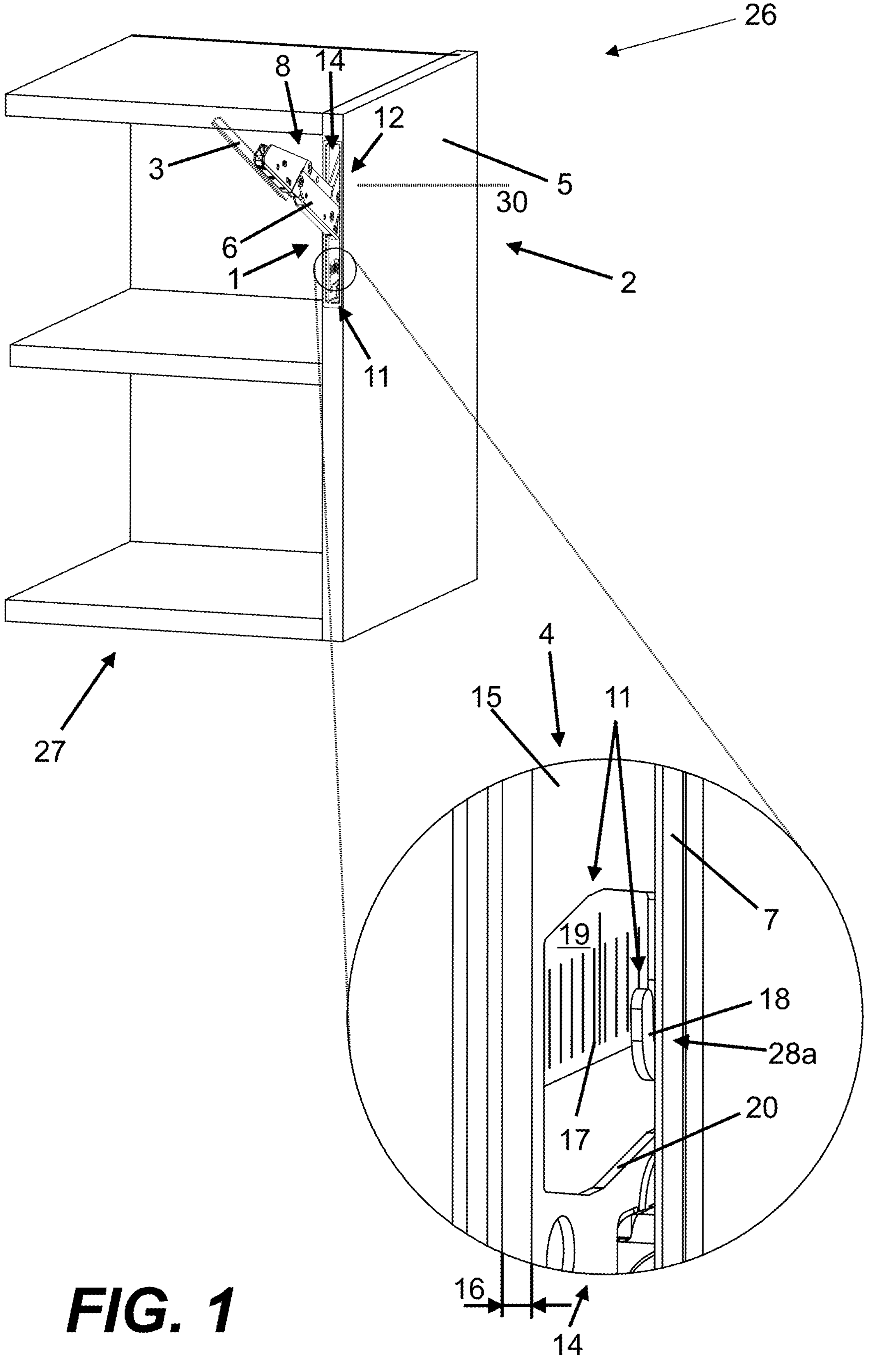
FIG. 1 shows a piece of furniture according to a preferred embodiment with a furniture drive according to a preferred embodiment in a furniture panel in a perspective view from the front and an enlarged detail section of a display in a first relative position.

FIG. 1 shows a piece of furniture 26 with a furniture body 2, wherein the piece of furniture 26 has a furniture drive 1. The furniture body 2 has a vertically arranged furniture panel 5 and a housing 4 of the furniture drive 1 is mounted to (more particularly, arranged in) the furniture panel 5. In general, the furniture drive 1 can also be mounted to (arranged on) the furniture panel 5.

For reasons of clarity, a movable furniture part 3 is indicated in dashed lines and does not appear in the following figures; however, it is generally arranged on the furniture drive 1. The furniture part 3 is fastened on the actuating arm 6 of the furniture drive 1 via a fastener. The furniture part 3 is mounted movably relative to the furniture body 2 and formed as a furniture flap that is pivotable about a horizontal axis 30 relative to the furniture body 2 in a position of use 27 of the piece of furniture 26.

The furniture part 3 is movable relative to the furniture body 2 by the furniture drive 1. The housing 4 of the furniture drive 1 is arranged completely, except for the end face 7, in the furniture panel 5 of the furniture body 2.

The number of furniture drives 1, the position in the furniture panel 5 and the number and/or orientation of the furniture panels 5 on which the furniture drives 1 are arranged are generally as desired.

In the detail section, a display 11 can be seen which makes it possible to read an adjustment of the force that can be exerted on an actuating arm 6 by a spring 9, with the viewing direction substantially from the front onto the piece of furniture 26 or rather substantially normal to the end face 7. An indicator 18 of the display 11 is present in a relative position 28*a*. The components of the furniture drive 1 are explained in more detail in FIG. 5*a* to FIG. 16.

The display 11 is formed separately from an adjustment bar 10 and can be read in an installed position 12 of the furniture drive 1, in which the housing 4 is arranged completely, except for the end face 7, in the furniture panel 5 of the furniture body 2.

Figure 2:
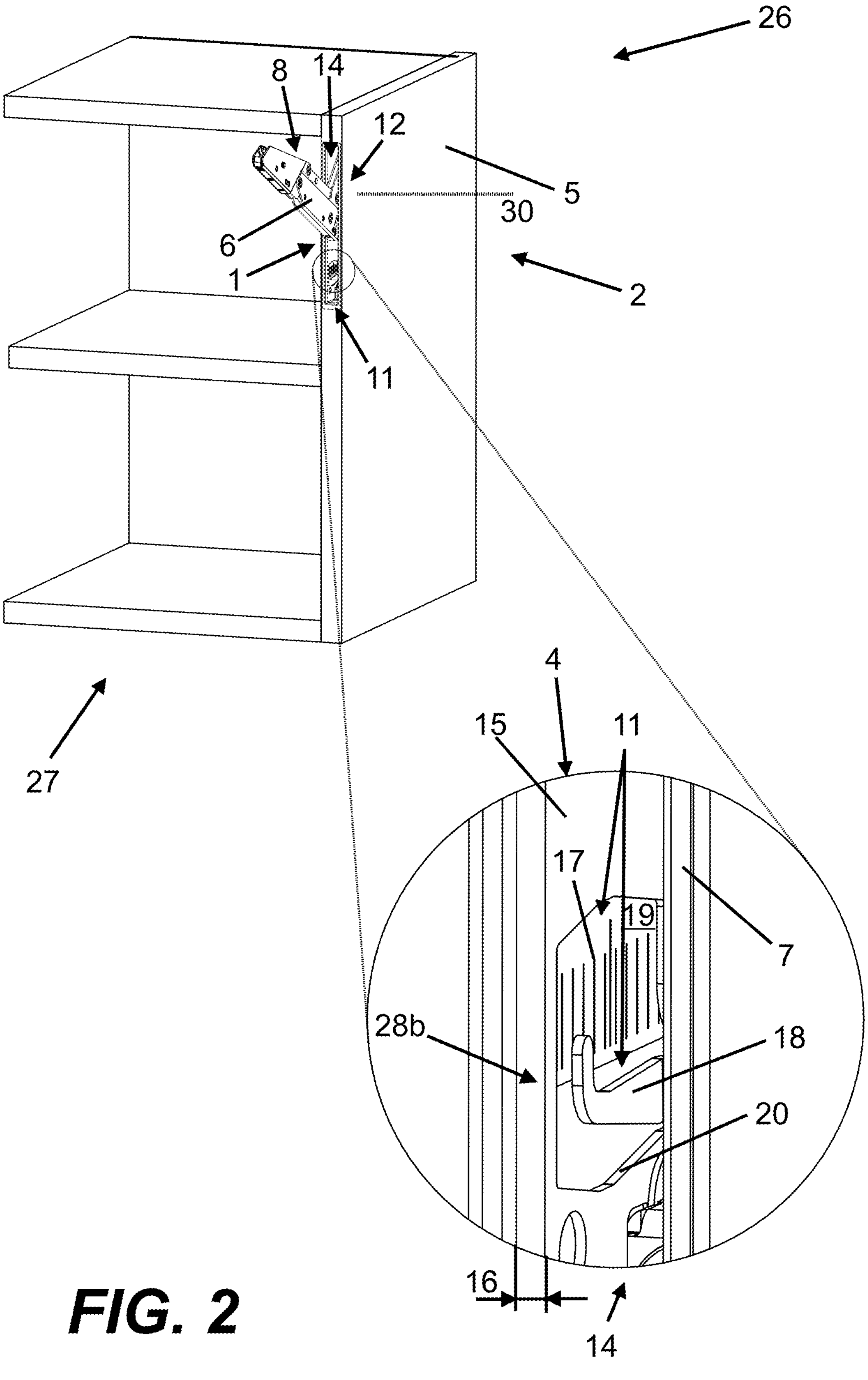
FIG. 2 shows the piece of furniture according to the embodiment of FIG. 1 with an enlarged detail section of the display in a second relative position.

FIG. 2 differs from FIG. 1 only in the fact that the indicator 18 of the display device 11 is present in an altered relative position 28*b*. In the relative position 28*b*, an adjustment of the force that can be exerted on the actuating arm 6 by the spring 9 is chosen to be smaller than in FIG. 1 (relative position 28*a*), since the indicator 18 is moved further, relative to measurement symbols including a scale 17, in the direction of the end face 7.

In general, however, any relative position 28*b* in which the indicator 18 is located closer to the end face 7 can display an increased force adjustment. An inverted scale 17 can take this situation into account. The relative positions 28*a*, 28*b* do not limit the display device 11, wherein any number of relative positions 28*a*, 28*b* is possible each with different force adjustments.

Figure 3:
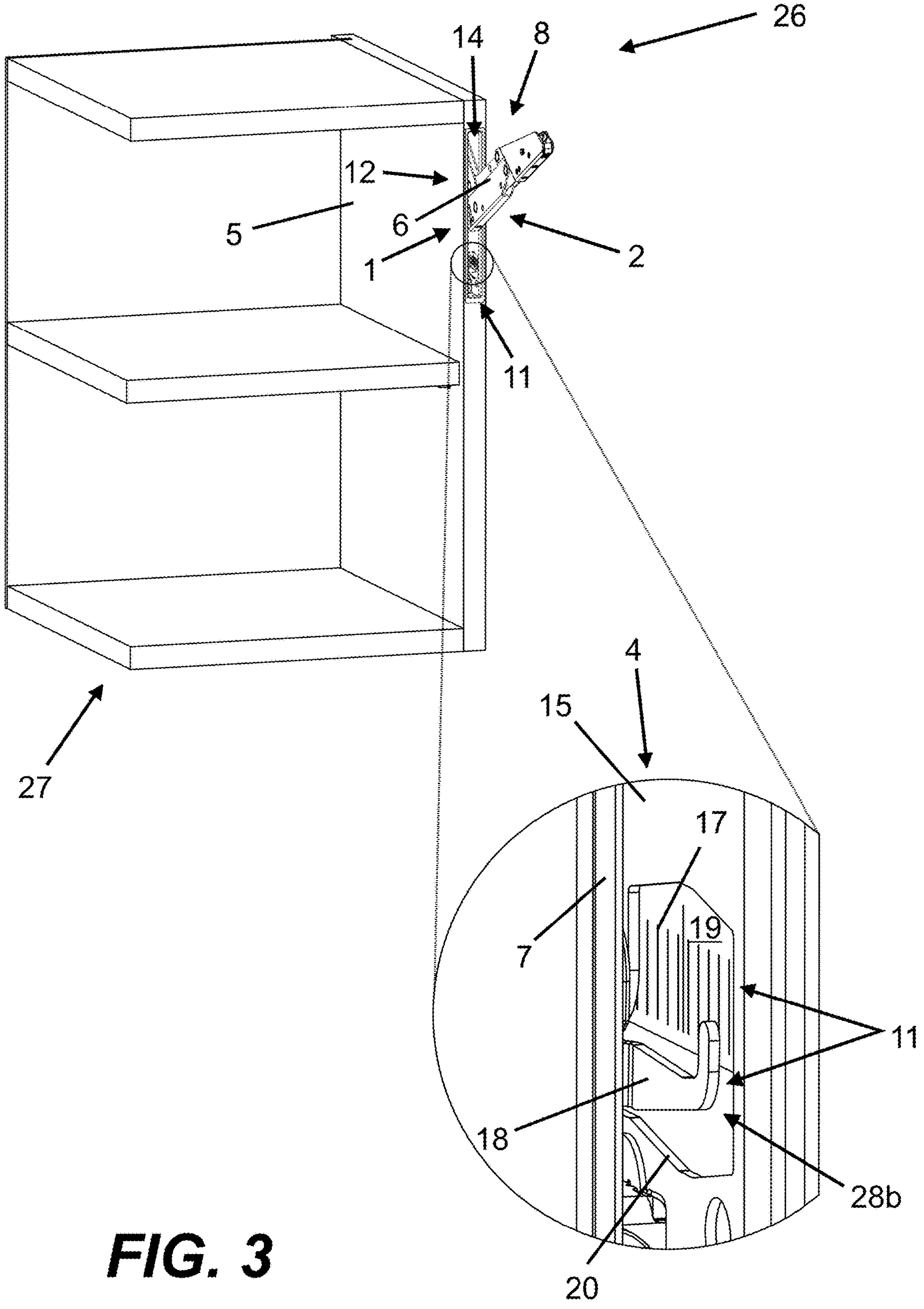
FIG. 3 shows the piece of furniture according to the embodiment of FIG. 2 in a further perspective view from the front.

FIG. 3 differs from FIG. 2 only in the fact that a viewing angle onto the furniture panel 5 is obtained from the opposite side of the furniture panel 5. The display device 11 can be read from both sides in the case of an oblique viewing angle relative to a vertical onto the end face 7.

Figure 4:
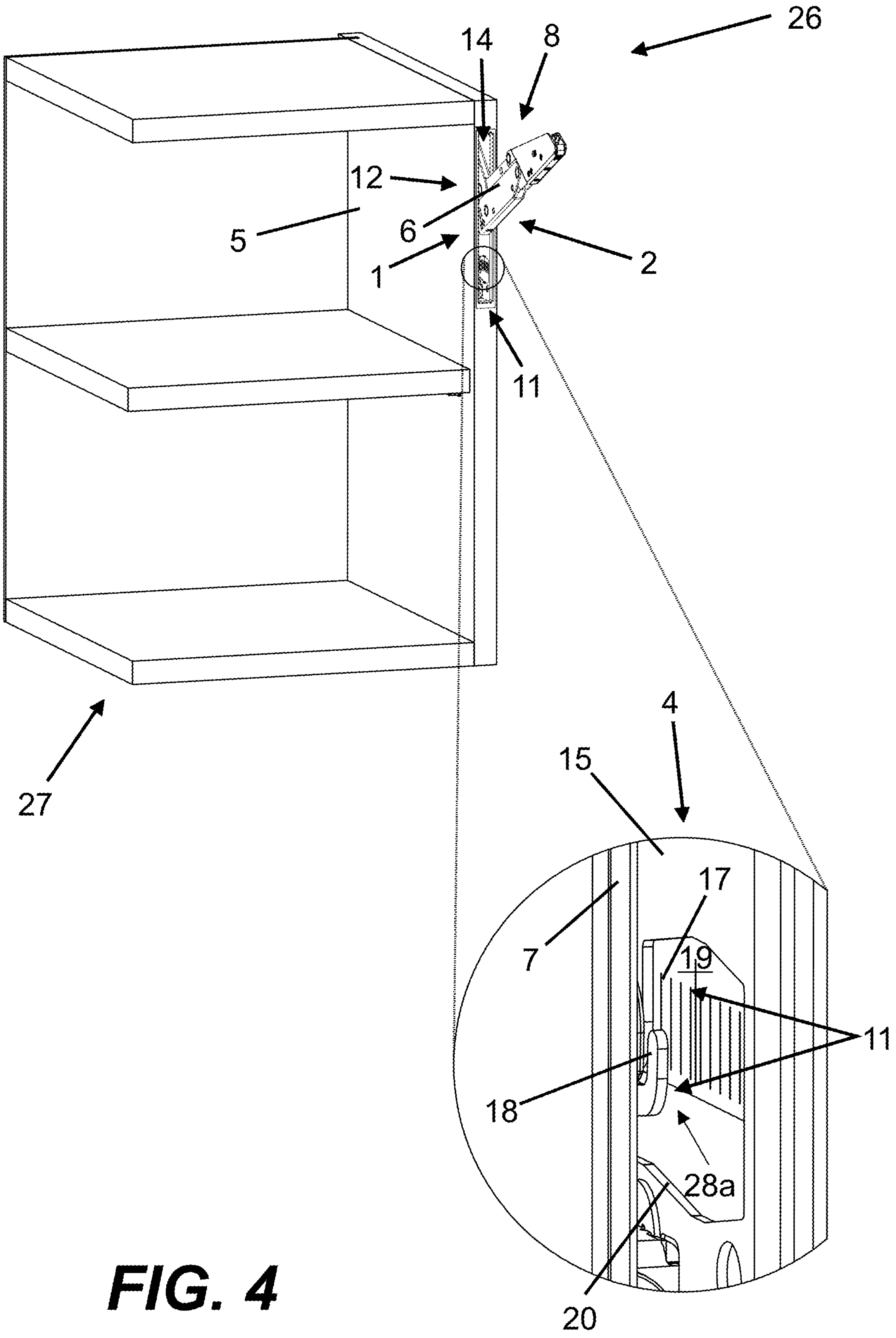
FIG. 4 shows the piece of furniture according to the embodiment of FIG. 1 in a further perspective view from the front.

FIG. 4 differs from FIG. 3 only in the fact that the indicator 18 is again positioned in the first relative position 28*a* relative to the scale 17.

Figure 5A:
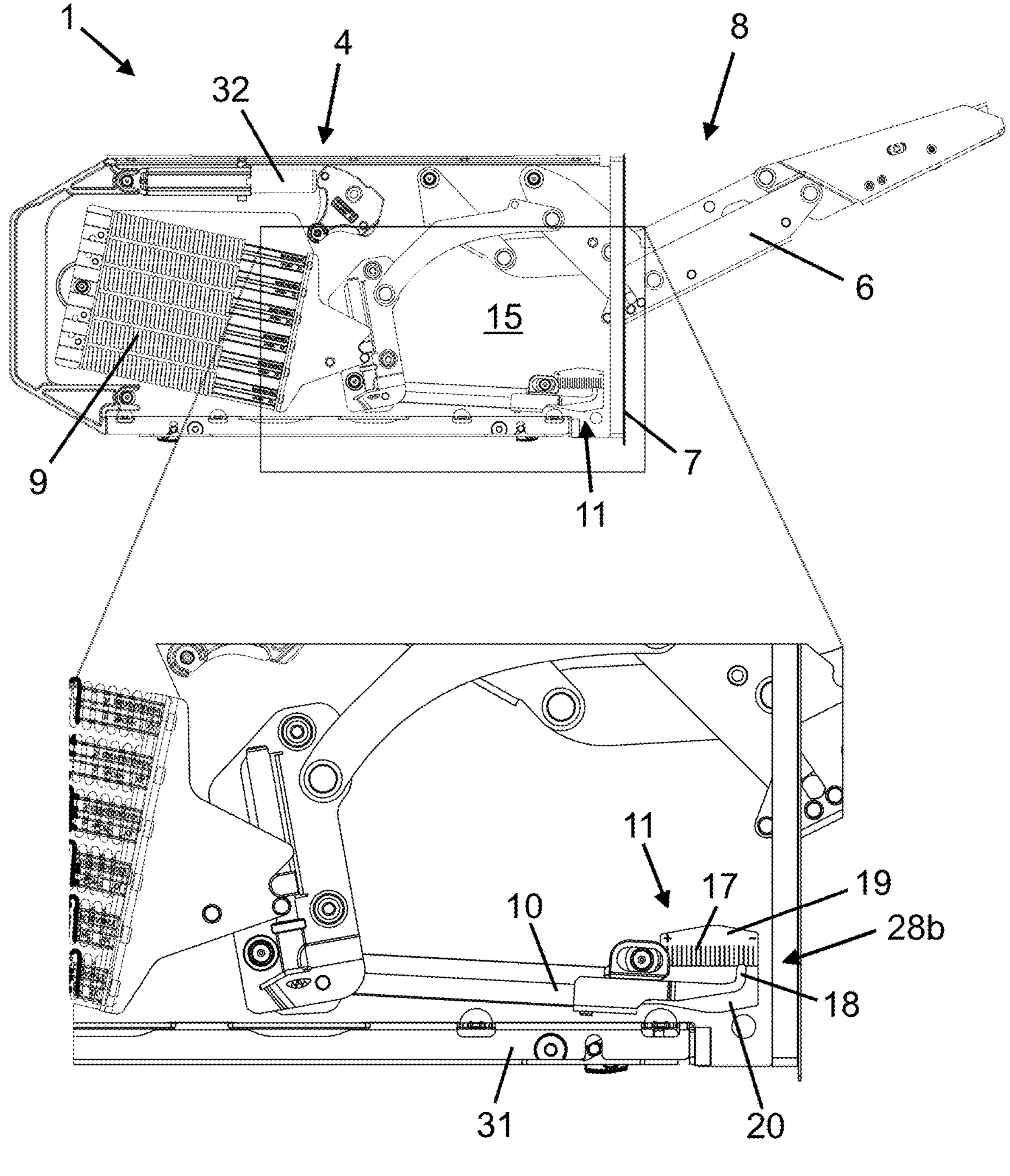
FIG. 5*a* shows the furniture drive according to the embodiment of FIG. 1 with a display in the second relative position, wherein a side face of a housing is dismantled, in a view from the side with an enlarged detail section of an adjustment bar.

FIG. 5*a* shows a furniture drive 1 for moving the furniture part 3 that is mounted movably relative to the furniture body 2, comprising the housing 4, which is mounted to (i.e., can be arranged on or in) the furniture panel 5 of the furniture body 2, and an actuating arm 6 that is mounted movably relative to the housing 4 and on which the movable furniture part 3 can be fastened.

The housing 4 has an end face 7, through which the actuating arm 6 protrudes in a plurality of relative positions 8. The furniture drive 1 has a spring 9, with which a force can be exerted on the actuating arm 6, an adjustment bar 10 for adjusting the force that can be exerted on the at least one actuating arm 6 by the spring 9, and the display 11, with which a force adjustment that can be carried out by the adjustment bar 10 is displayed.

The spring 9 includes spiral springs, which are represented as shortened in order to see the spring holders on which the spiral springs are arranged. However, in general, the spiral springs extend fully over the longitudinal extension of the spring holders.

However, in general, the spring 9 can also comprise other types of energy store, such as fluid energy stores, and is not limited to the use of spiral springs. A damper 32 for damping a movement of the actuating arm 6 is arranged above the spring 9.

The display 11 can be read in the installed position 12 of the furniture drive 1, at least in the relative position 8 in which the actuating arm 6 protrudes through the end face 7 of the housing 4.

Figure 5B:
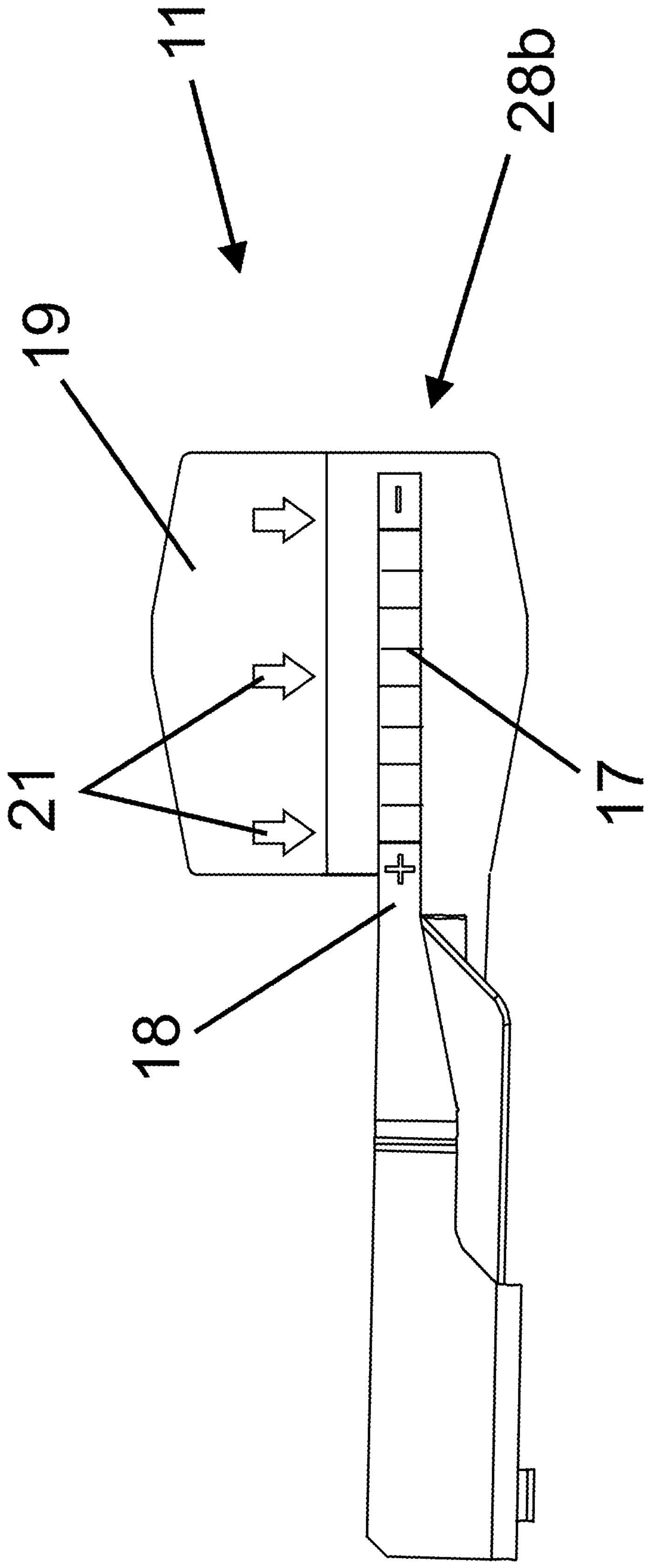
FIG. 5*b* shows a display with a scale on an indicator and markings on a film in a schematically represented view from the side.

FIG. 5*b* shows a display 11 including an indicator 18 and measurement symbols 17, 21. In particular, the measurement symbols 17, 21 include a scale 17 arranged on the indicator 18 movable relative to the housing 4, and markings 21 on the housing 4. More particularly, the indicator 18 is moved relative to markings 21 on a film 19 in the case of a force adjustment via the adjustment bar 10. The display 11 is in a relative position 28*b* with a low force of the spring 9 set on the actuating arm 6. The markings 21 can generally also be carved into or painted on the housing 4 or formed by embossments on and/or indentations in the housing 4.

The indicator 18 is movable relative to the markings 21 when the force that can be exerted on the actuating arm 6 by the spring 9 is adjusted. The adjustment of the force that can be exerted on the actuating arm 6 by the spring 9 can be read from a position 28*b* of the markings 21 relative to the indicator 18.

Figure 6A:
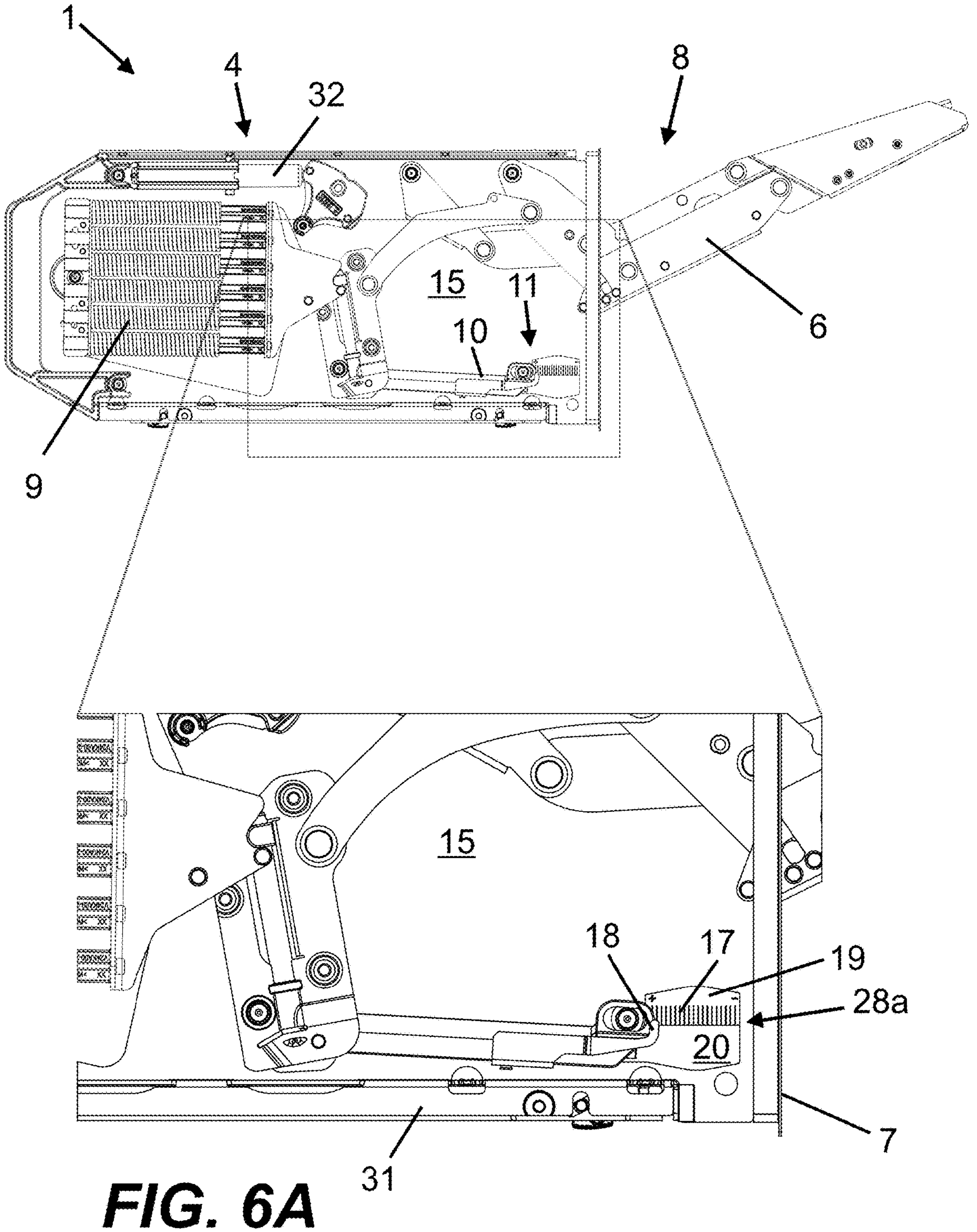
FIG. 6*a* shows the furniture drive according to the embodiment of FIG. 5*a* in the first relative position.

FIG. 6*a* differs from FIG. 5*a* only in the fact that the indicator 18 in the form of a punched metal sheet 18*a* is arranged in a further relative position 28*a* relative to the scale 17, whereby an increased force adjustment can be ascertained by an operator and/or installer of the furniture drive 1 when looking substantially normally onto the end face 7 or rather slightly obliquely onto the end face 7, in particular in the installed position.

Figure 6B:
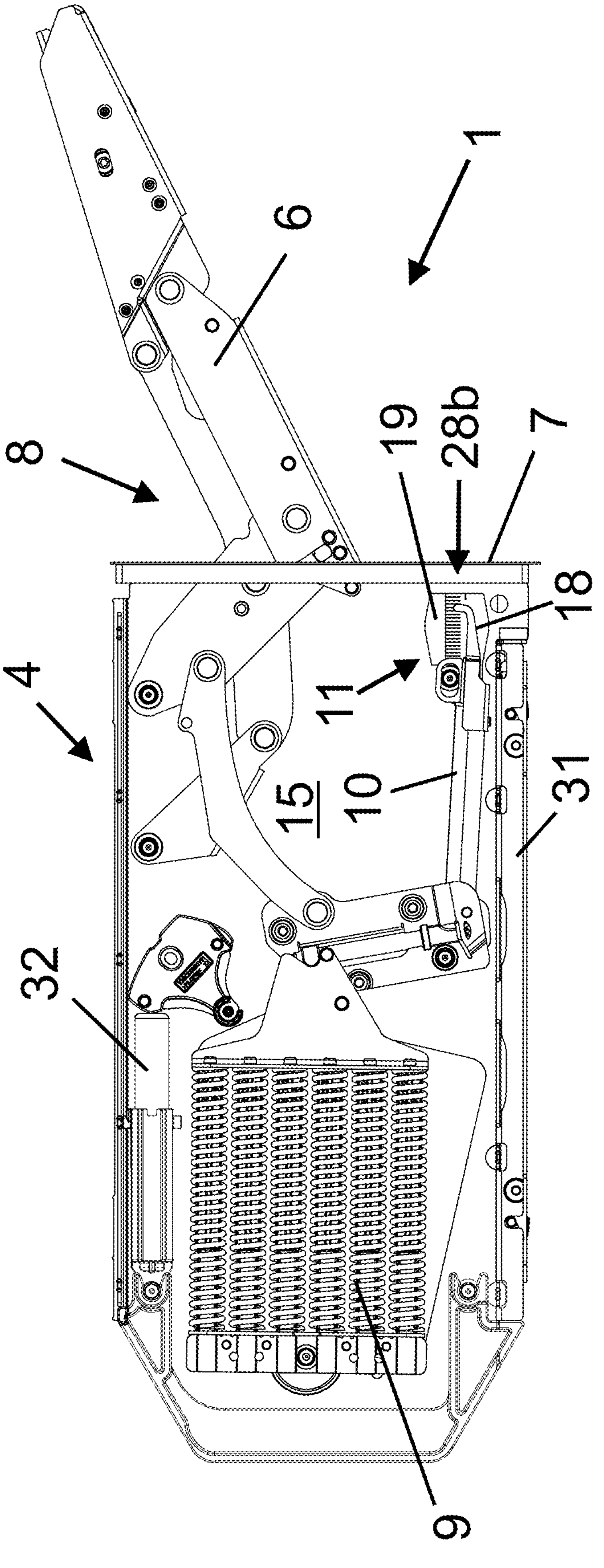
FIG. 6*b* shows the furniture drive according to FIG. 6*a*, wherein the display is inverted.

FIG. 6*b* differs from FIG. 6*a* only in the fact that inverted kinematics are represented, wherein the second relative position 28*b* displays an identical point of contact of the spring 9 on a lever system, which is connected to the actuating arm 6, compared with FIG. 6*a*.

Figure 7A:
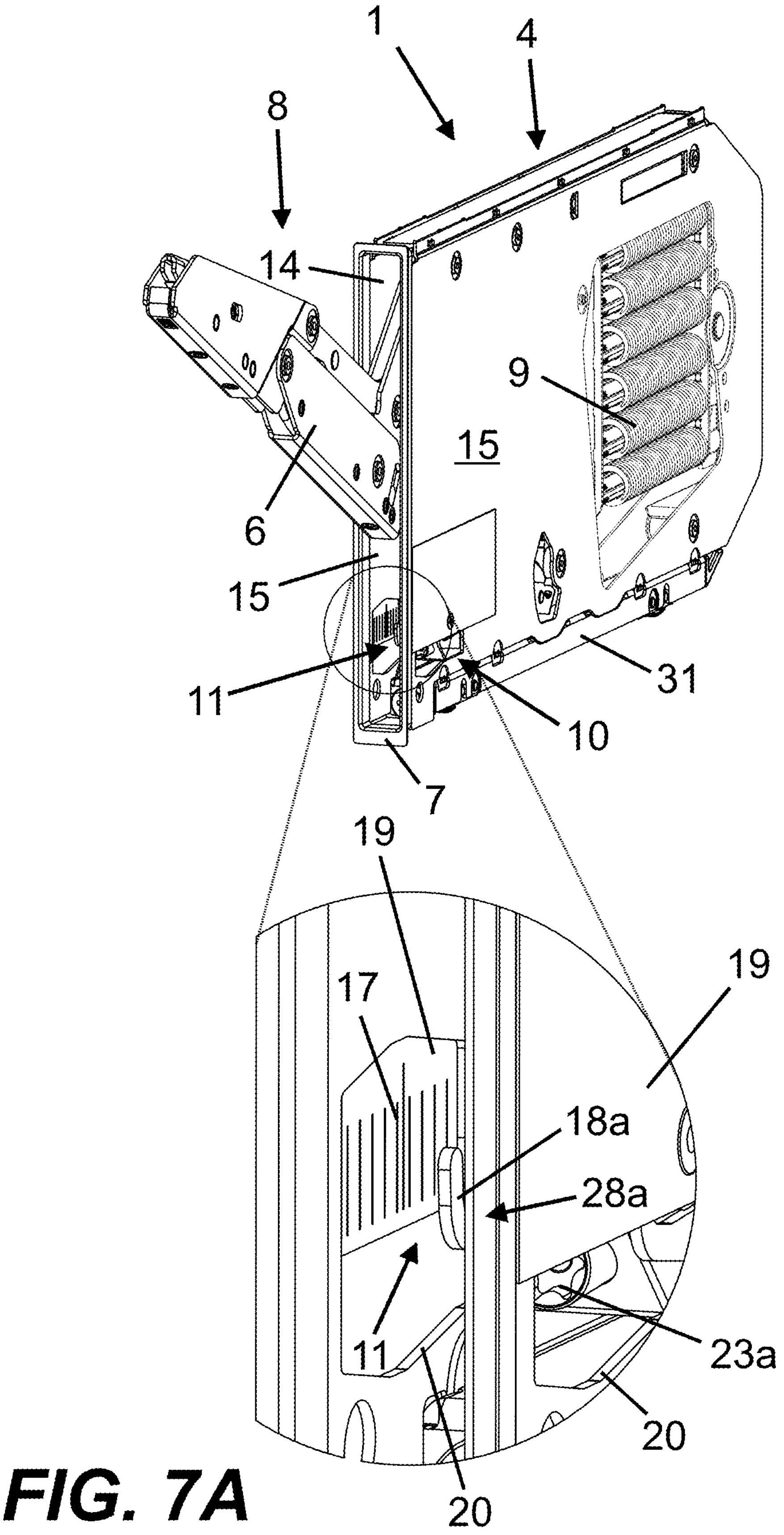
FIGS. 7*a*-7*b* shows the furniture drive according to FIG. 6*a* with the two side faces of the housing in two perspective views from the front with an enlarged detail section of the display.
Figure 7B:
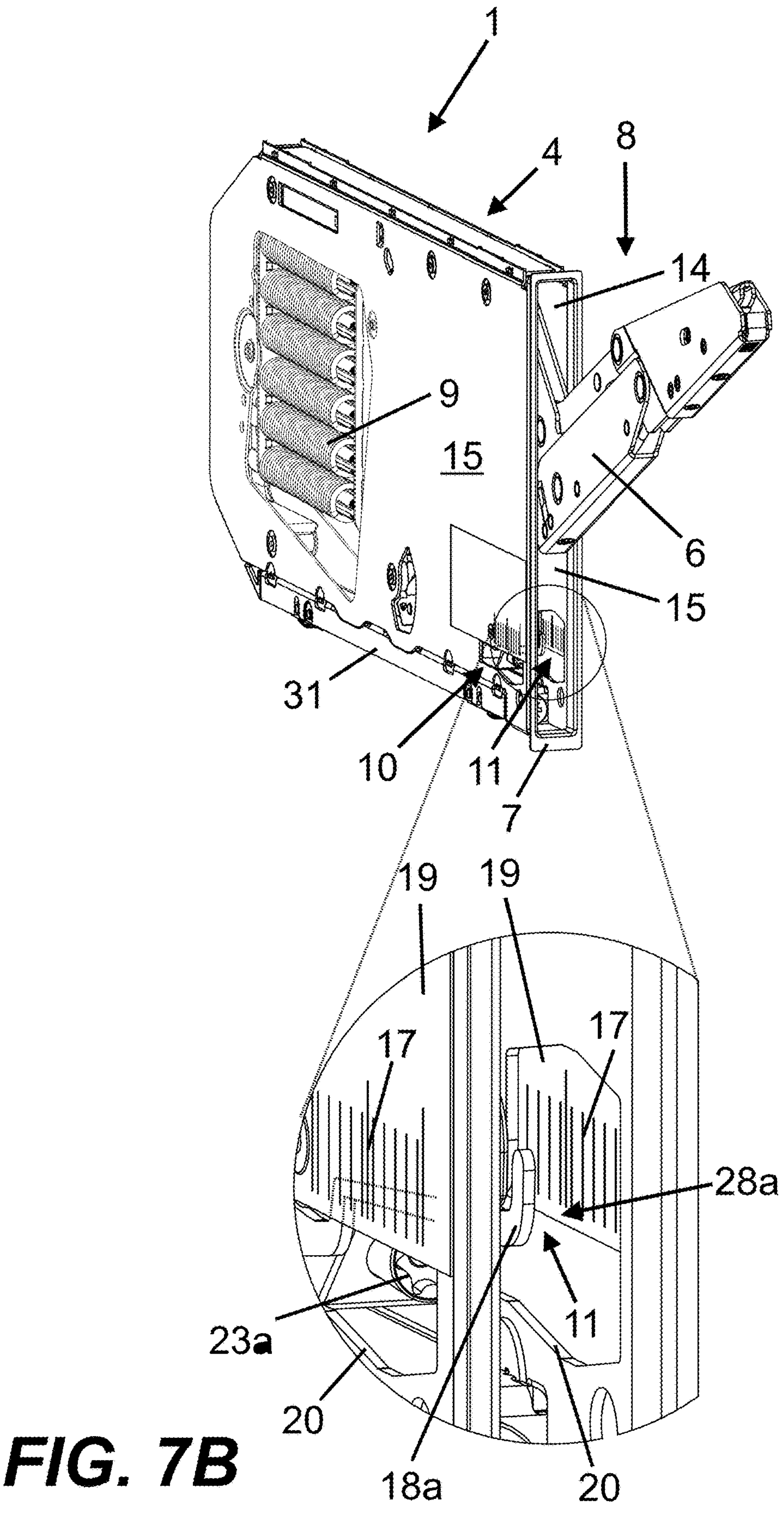

FIG. 7*a* and FIG. 7*b* show the furniture drive 1 with a complete housing 4, with which an installation of the furniture drives 1 in the installed position 12 in the piece of furniture 26 is particularly preferred.

An opening 14 is arranged in the end face 7 of the housing 4 and the display 11 is arranged partially in the interior of the housing 4, since the indicator 18 in the form of a metal sheet 18*a* is arranged completely inside the housing 4 and two scales 17 have been affixed to the housing 4 from the outside in each case via a film 19. The display 11 can therefore be read when looking through the opening 14 into the interior of the housing 4. The display 11 can generally also be arranged completely inside the housing 4.

The housing 4 has two side faces 15 spaced apart from one another, which are arranged parallel to one another and in each case transversely relative to the end face 7 of the housing 4. The display 11 is partially arranged between the two side faces 15. In general, the display 11 can also be arranged completely between or in a clear width 16 of the side faces 15.

The display 11 is arranged partially on the adjustment bar 10, wherein the display 11 is arranged on a side of the adjustment bar 10 facing the end face 7 and between the end face 7 and the at least one adjustment bar 10.

In FIG. 7*a*, the film 19 is not transparent and is secured on the housing 4 by some type of fastener. In FIG. 7*b*, the scales 17, on transparent films 19 made of plastic, are glued onto both side faces 15 of the housing 4 from the outside in areas above both housing openings 20. The scales 17 are arranged on a side of the film 19 facing the adjustment bar 10. The film 19 made of plastic is particularly preferably glued onto at least one of the side faces 15 from the outside, wherein the scale 17 is arranged on the adhesive side of the film 19.

Figure 7C:
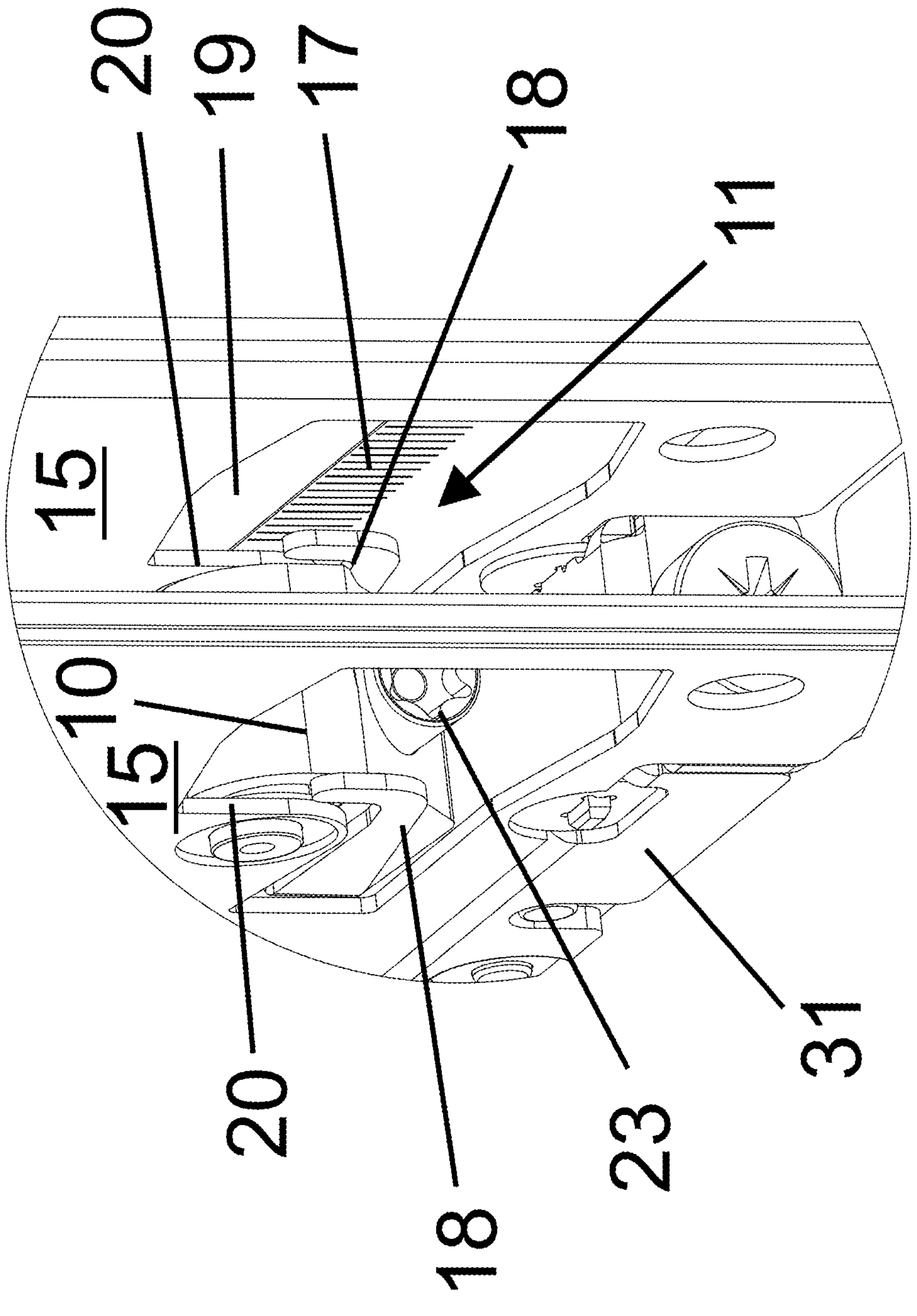
FIG. 7*c* is an enlarged detail section view of the display with a film arranged on a housing.

FIG. 7*c* shows a display device 11, wherein the scale 17 is arranged on one of the two side faces 15 and the second housing opening 20 is not covered by a film 19 at least partially. The scale 17 is arranged on an adhesive side of the film 19, wherein the region of the film on which the scale 17 is arranged is formed free of adhesive.

In general, the nature, number, and positioning of the films 19 is as desired. Two non-transparent plastic films, which are glued on both sides from the outside above two housing openings 20, have proved to be particularly advantageous and the scale 17 is located on the adhesive side.

Figure 8A:
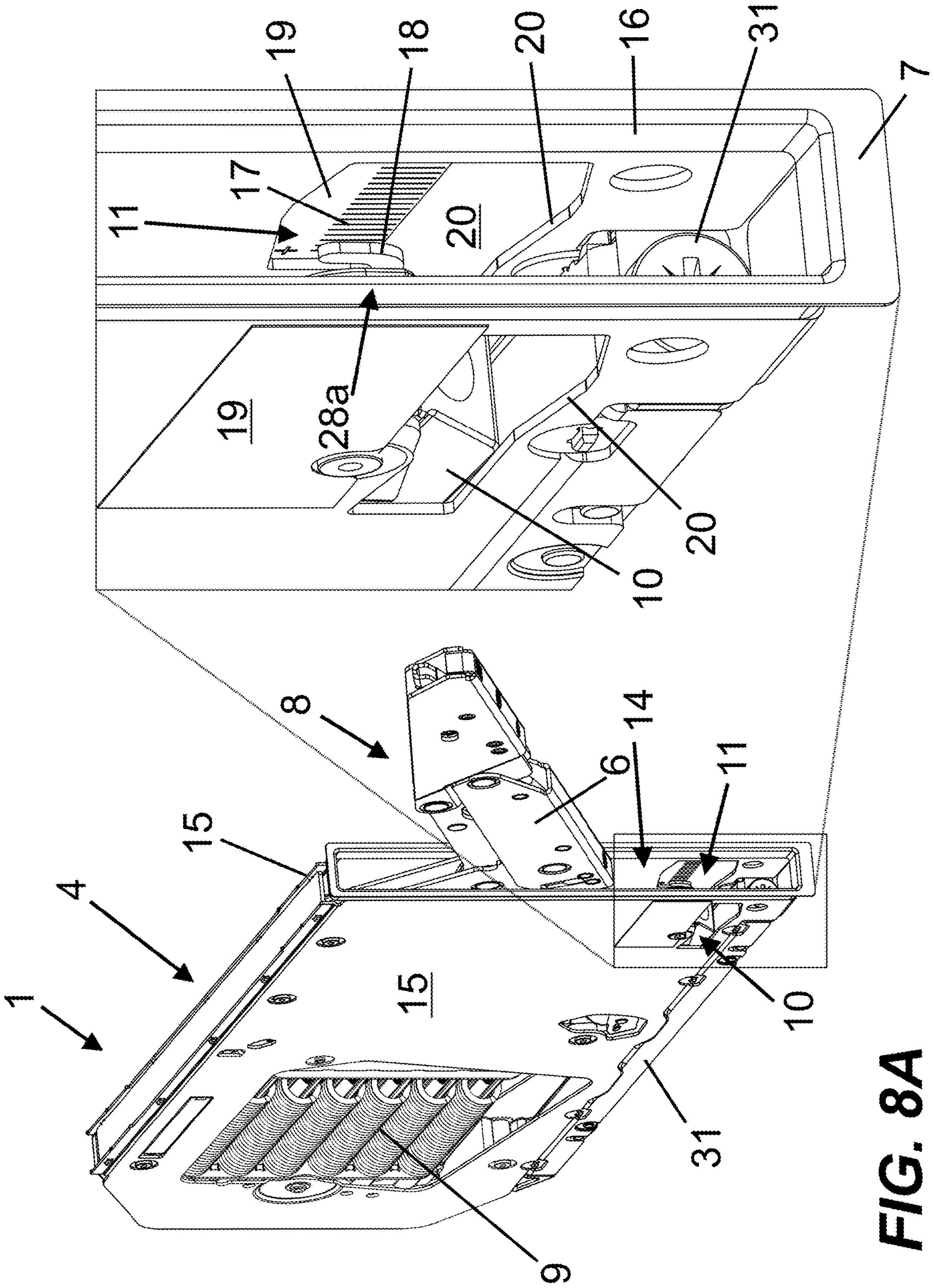
FIGS. 8*a*-8*c* shows the furniture drive according to the embodiment of FIG. 7*a* in a perspective view with three enlarged detail sections of the display in two relative positions and with internal contours.

FIG. 8*a* shows the furniture drive 1 with the display device 11 with two indicators 18, located between the side faces 15, which, through a relative position between two films 19, which are arranged in regions above two housing openings 20, display the force adjustment of the actuating arm 6 via the spring 9 to an operator from the outside with the viewing direction onto the end face 7 of the furniture drive 1.

Figure 8B:
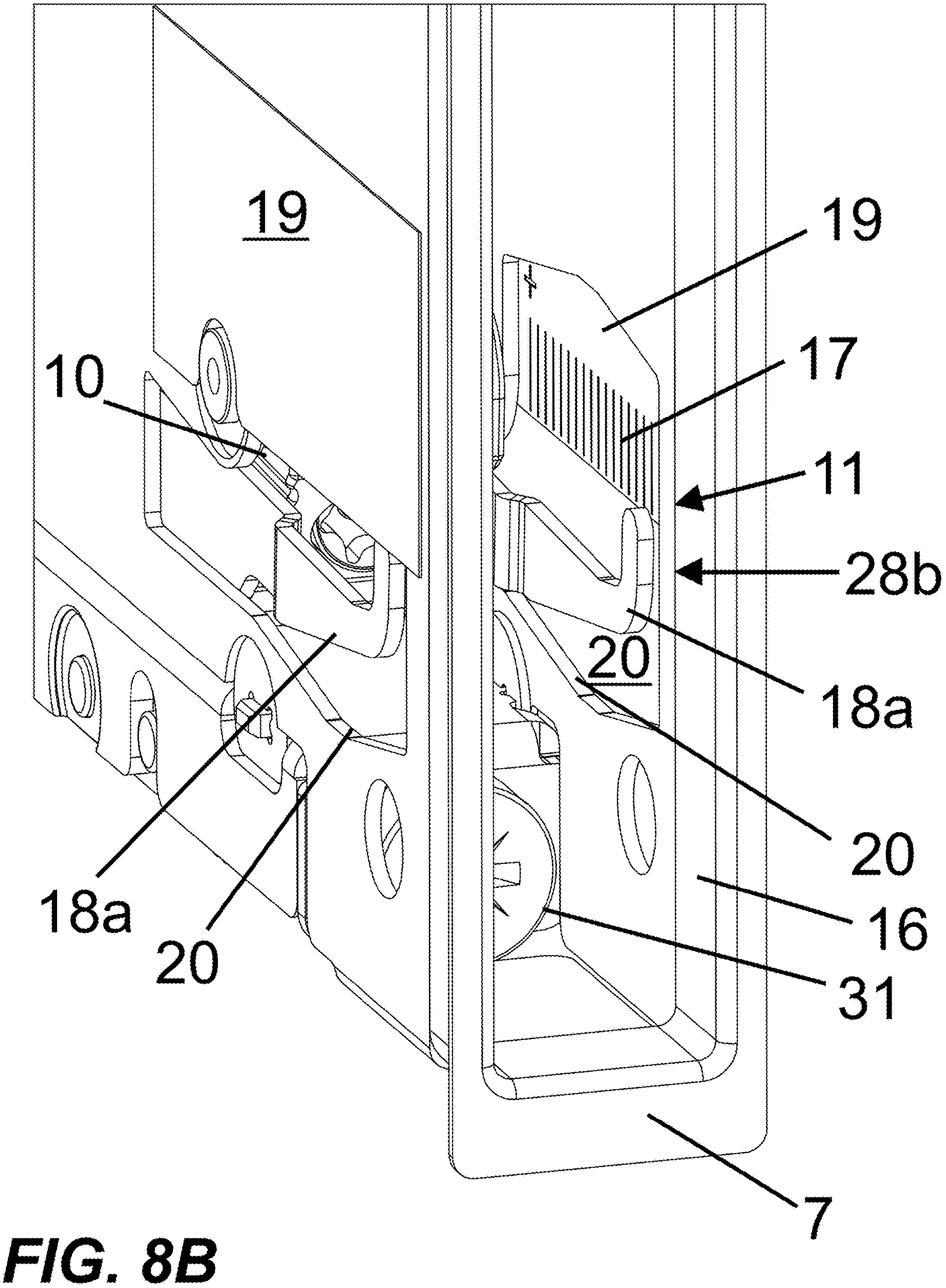
Figure 8C:
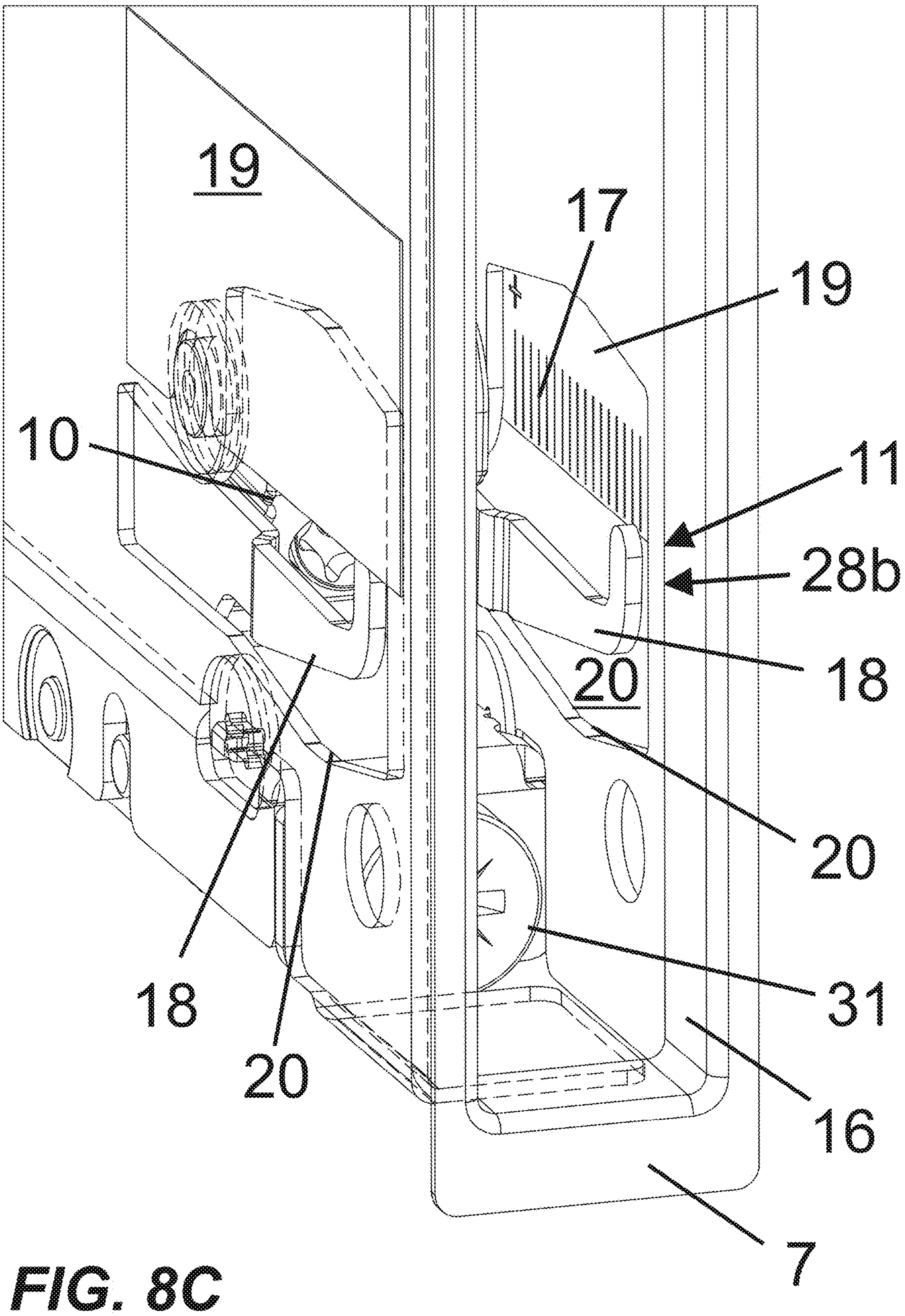

FIG. 8*b* and FIG. 8*c* show FIG. 8*a* in the second relative position 28*b*, wherein the second relative position 28*b* displays an altered force adjustment with a reduced application of force on the actuating arm 6 by the spring 9.

In FIG. 8*b*, the indicators 18 are in the form of a punched metal sheet 18*a* that is also bent in a region where it is connected to the adjustment bar. In general, the indicators 18 can, however, also consist of injection-moulded plastic, for example. The indicators 18 are movable in a translational manner in a movement direction normal to the end face 7.

In FIG. 8*c*, a positioning of the components involved in the display 11 and concealed by the film 19 is illustrated with dashed lines.

The display 11 comprises two scales 17 and two indicators 18 that are movable relative thereto, wherein the two scales 17 are glued onto the housing 4. In general, the scales 17 can also be engraved into a part of the furniture drive 1.

The indicators 18 are movable relative to the scales 17 when the force that can be exerted on the actuating arm 6 by the spring 9 is adjusted and the adjustment of the force that can be exerted on the actuating arm 6 by the spring 9 can be read from the positions 28*a*, 28*b* of the indicators 18 relative to the scales 17 from both sides of the end face 7.

Figure 9:
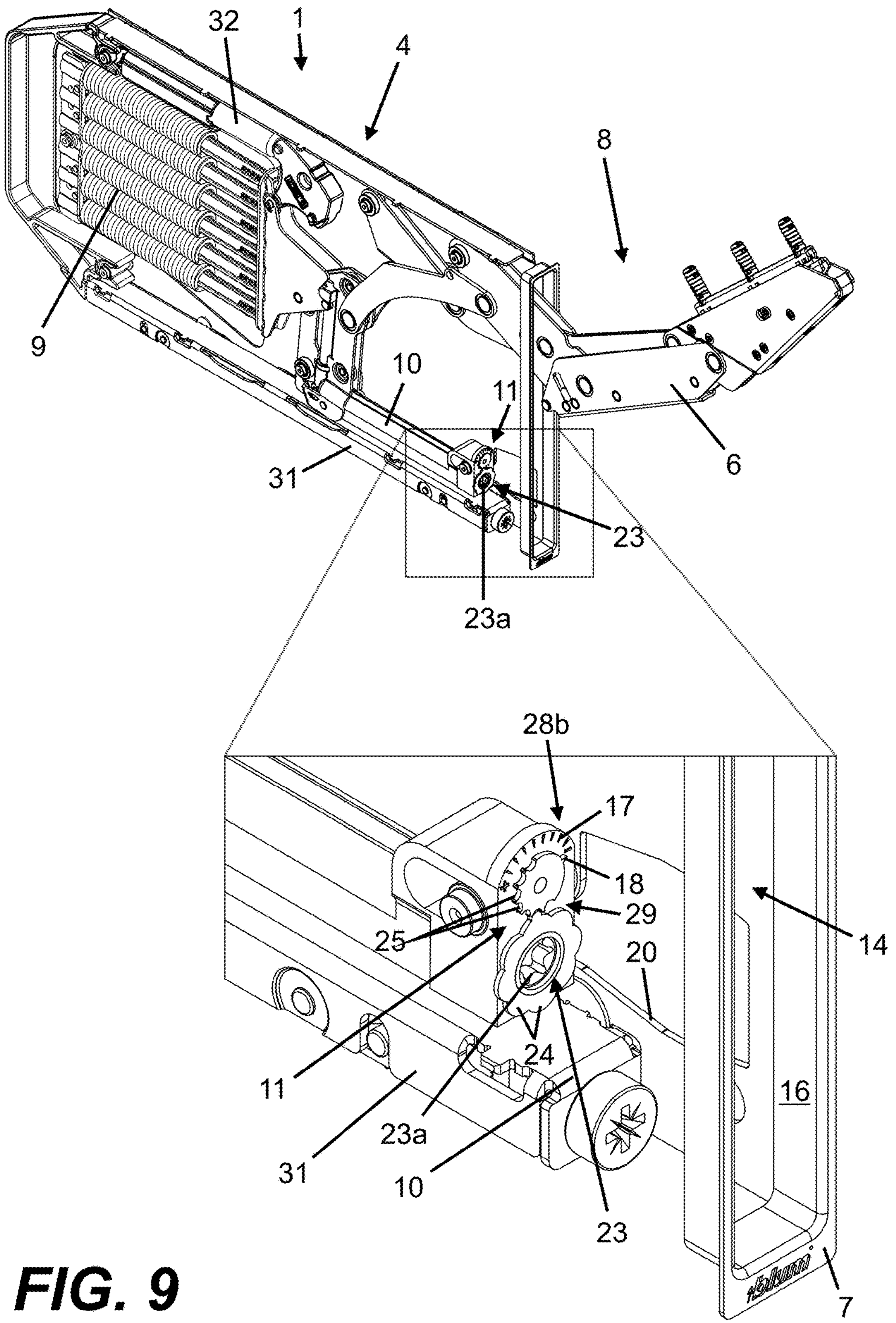
FIG. 9 shows a furniture drive according to a further preferred embodiment in a second relative position with dismantled second side face of a housing in a perspective view with an enlarged detail section of the display device.

FIG. 9 shows a furniture drive 1 with a display 11, wherein the display 11 comprises a plurality of protrusions of catch 24, wherein the catch 24 can catch in any of a plurality of grooves of the receiver 25. The display 11 has a transmission 29 via which an adjustment of the force that can be exerted on the actuating arm 6 by the spring 9 by the adjustment bar 10 can be transmitted with a transmission ratio.

The display 11 has a scale 17 arranged on a segment of a circle, wherein the transmission 29 and an indicator 18 are formed rotatable in a plane parallel to the end face 7 in the case of a force adjustment of the actuating arm 6 by the adjustment bar 10.

In order to adjust the force adjustment, the adjustment bar 10 has a readjusting device 23 in the form of a tool holder 23*a*, wherein the adjustment of the force that can be exerted on the actuating arm 6 by the spring 9 is adjustable via the readjustment bar 23.

Figure 10A:
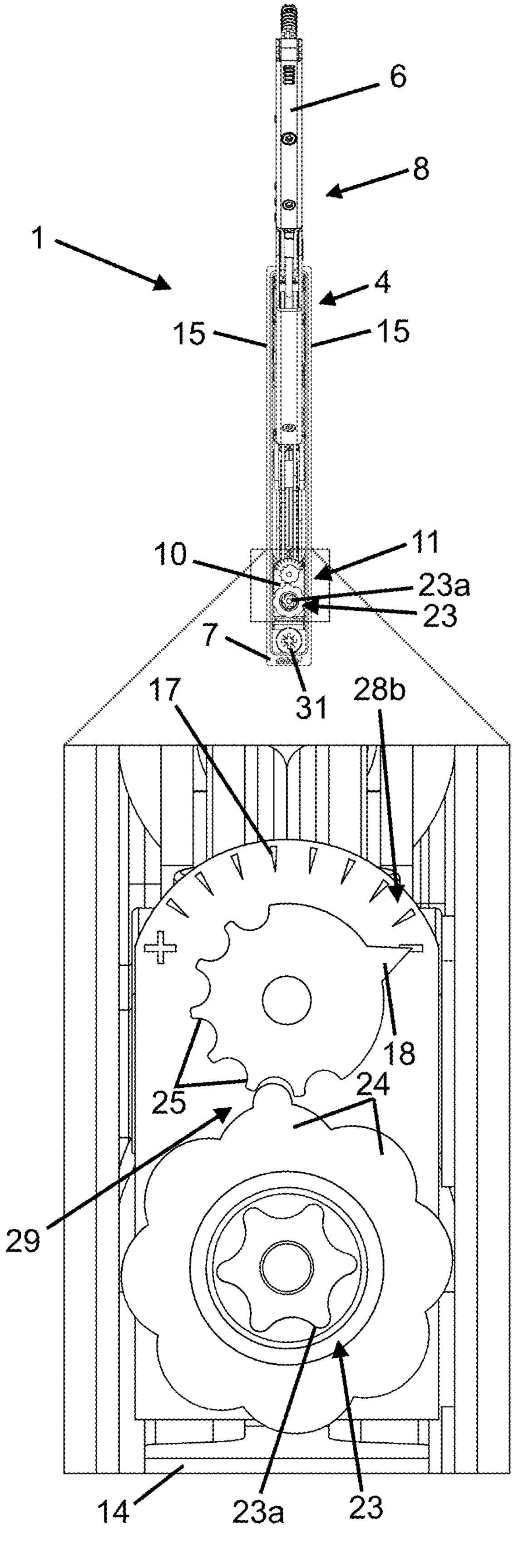
FIGS. 10*a*-10*b* shows the furniture drive of FIG. 9 with the two side faces in two relative positions in a view from the front with an enlarged detail section of the display device.

FIG. 10*a* shows the furniture drive according to FIG. 9 with both installed side faces 15 in a view normal onto the end face 7. The indicator 18 is arranged relative to the scale 17 such that the relative position 28*b*, with a minimal application of force on the actuating arm 6 by the spring 9, is displayed.

Figure 10B:
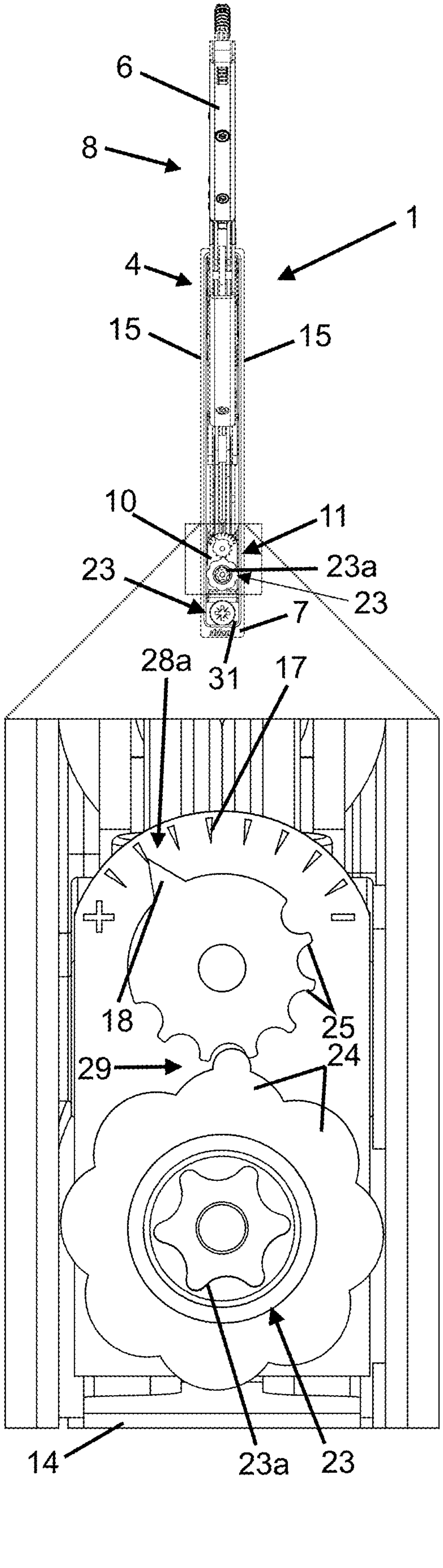

FIG. 10*b* differs from FIG. 10*a* only in the fact that the display 11 is in an altered relative position 28*a*, wherein an operator of the furniture drive 1 can read an increased force adjustment of the actuating arm 6 through a viewing direction normal onto the end face 7.

Figure 11:
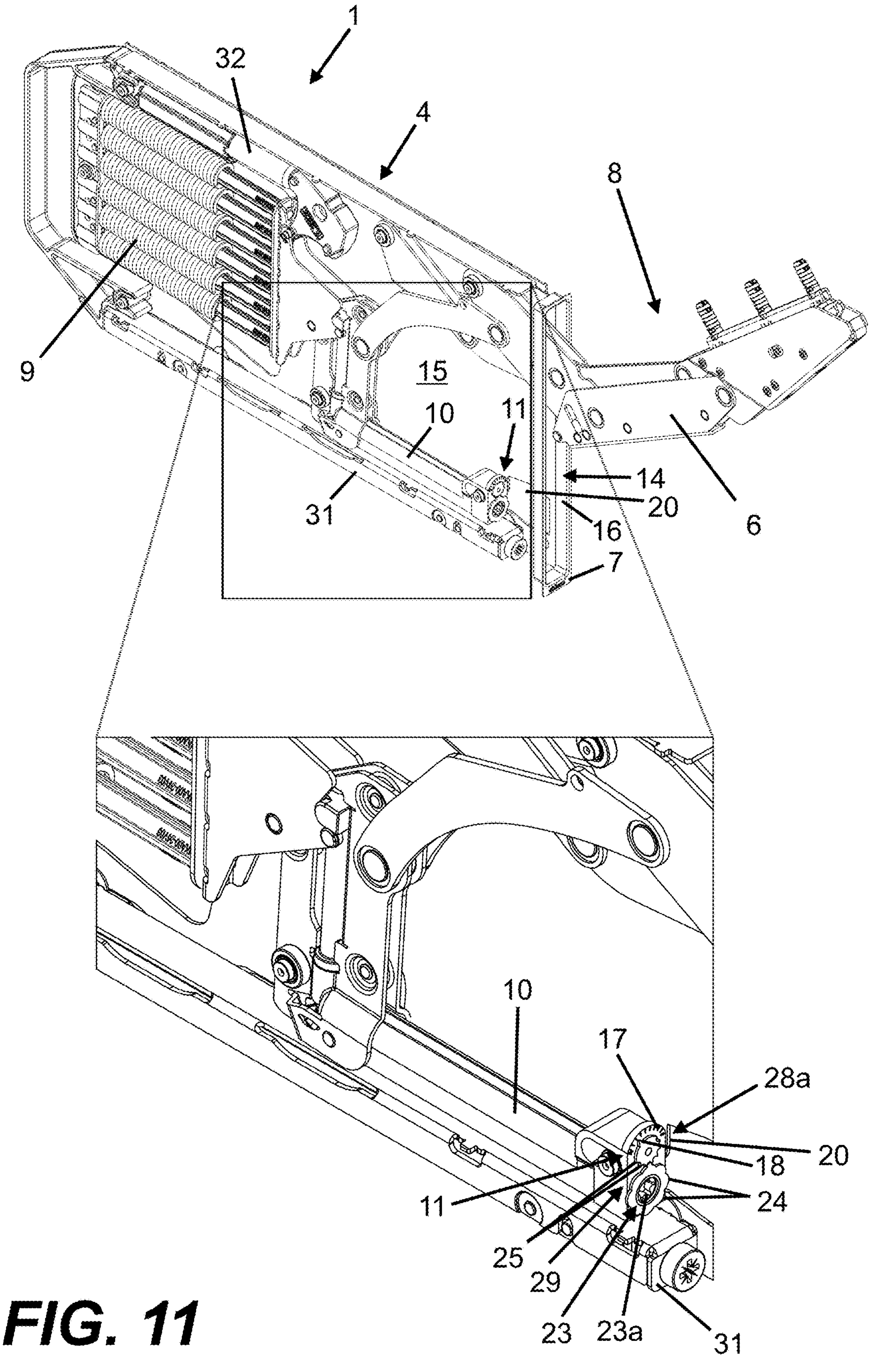
FIG. 11 shows the furniture drive of FIG. 9 in a first relative position with an enlarged detail section of an adjustment bar.

FIG. 11 differs from FIG. 9 only in the fact that the display 11 is present in the relative position 28 *a*. As the point of contact of the spring 9 on the lever system, which is kinematically coupled to the actuating arm 6, is unaltered, there is an altered movable furniture part 3 with a reduced mass, for example. An operator or installer of the furniture drive 1 can thus estimate the effort required, with which the movable furniture part 3 can be moved with the aid of the furniture drive 1.

In the representation, the spring 9 includes shortened spiral springs, in order to see the spring supports on which the spiral springs are arranged. However, the spiral springs generally extend over the entire longitudinal extension of the spring supports.

Figure 12:
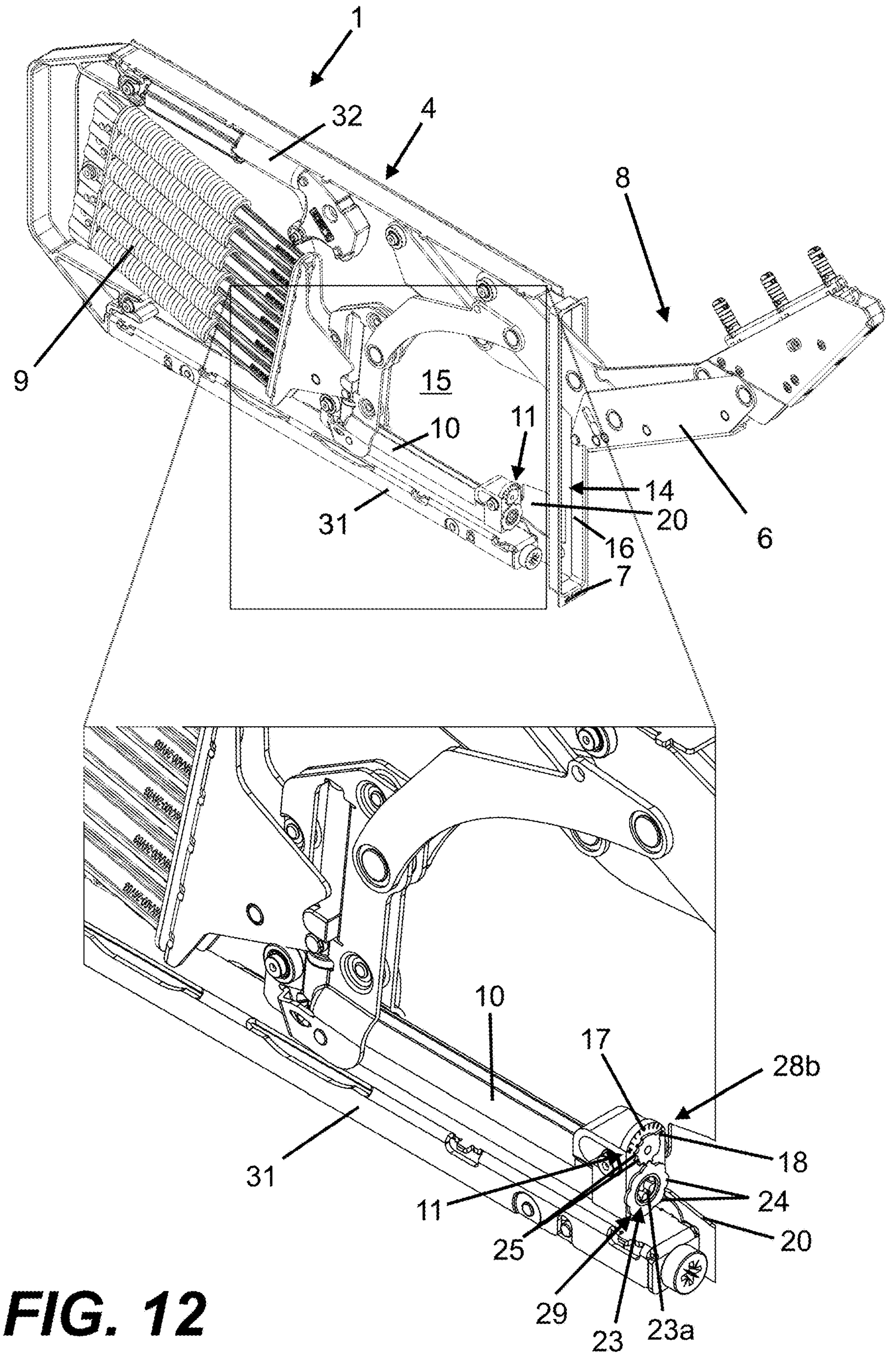
FIG. 12 shows the furniture drive of FIG. 9 in a second relative position with an enlarged detail section of the adjustment bar.

FIG. 12 differs from FIG. 11 only in the fact that the force adjustment has been manipulated via the adjustment bar 10, wherein a point of contact of the spring 9 has been moved downwards and, due to the adjustment of the force adjustment via the adjustment bar, the display 1 is present in the relative position 28*b*, in order to display to the operator an altered effort required to move the movable furniture part 3.

The point of contact of the spring 9 on the lever system of the actuating arm 6 can be adjusted via the adjustment bar 10 and is coupled to the force adjustment and to the display via the display. Through an alteration of the force adjustment via the adjustment bar 10, an altered torque acts on the actuating arm 6, as a result of which the force acting on the movable furniture part 3 is altered.

A fastener 31 for fastening the housing 4 in a recess of the furniture body 2 is arranged on the furniture drive 1.

The fastener 31 comprises a rotatably mounted actuating element and two fastening elements that can be countersunk in a wall of the recess and/or pressed onto the wall. A coupling device is provided in the case of the fastener 31 with which a rotational movement of the actuating element can be converted into a countersinking movement and/or into a pressing-on movement of the two fastening elements. The actuating element and the two fastening elements are arranged on the same side of the housing 4 and spaced apart from one another in a longitudinal direction of the housing 4. The number of fasteners is generally as desired.

Figure 13A:
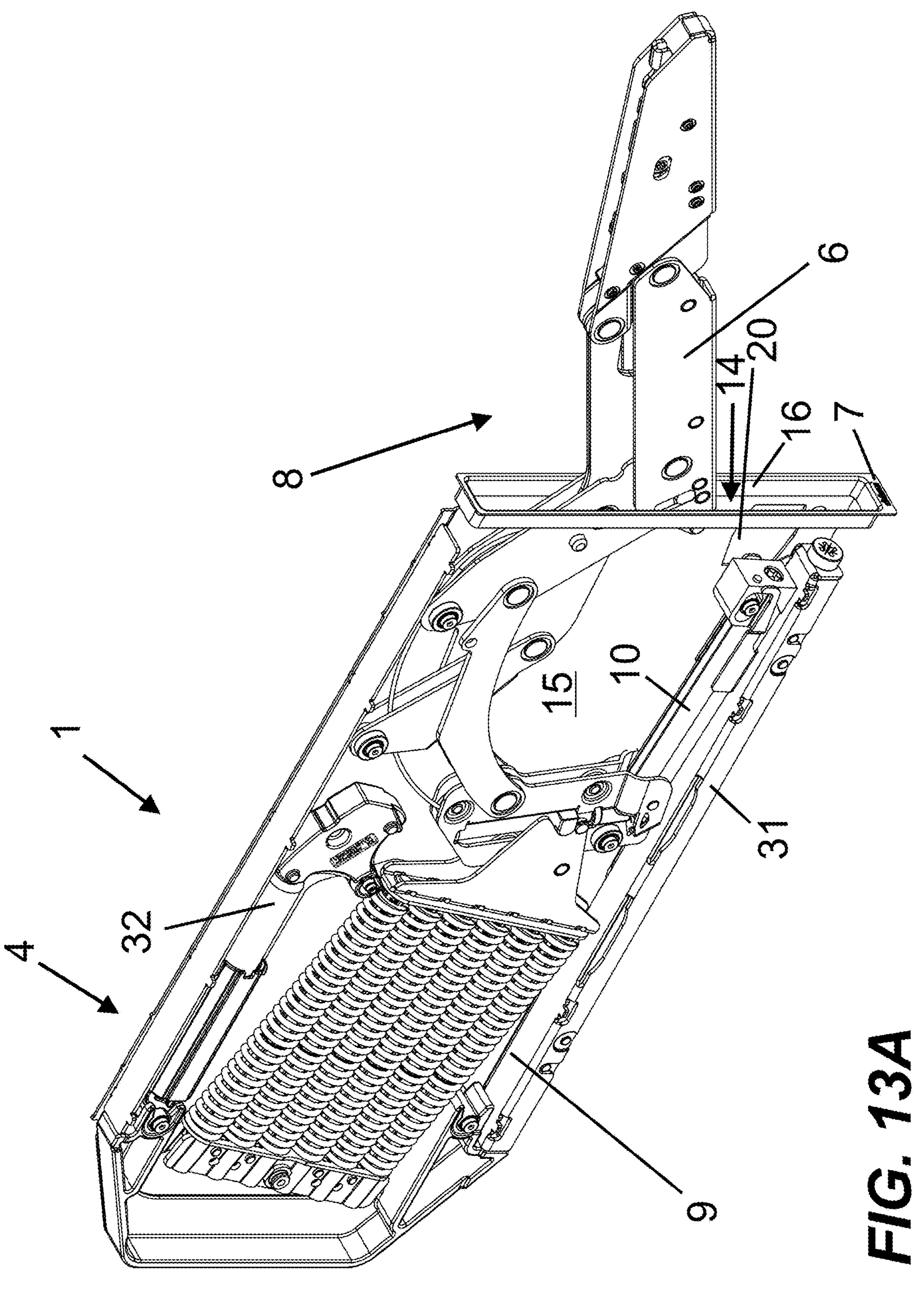
FIGS. 13*a*-13*c* shows the furniture drive of FIG. 9 before an arrangement of a display device, and two enlarged detail sections of the display in two relative positions with a transmission altered compared with FIG. 9, in a perspective view.

FIG. 13*a* shows the furniture drive 1 with an adjustment bar 10, wherein the display 11 has not yet been installed.

Figure 13B:
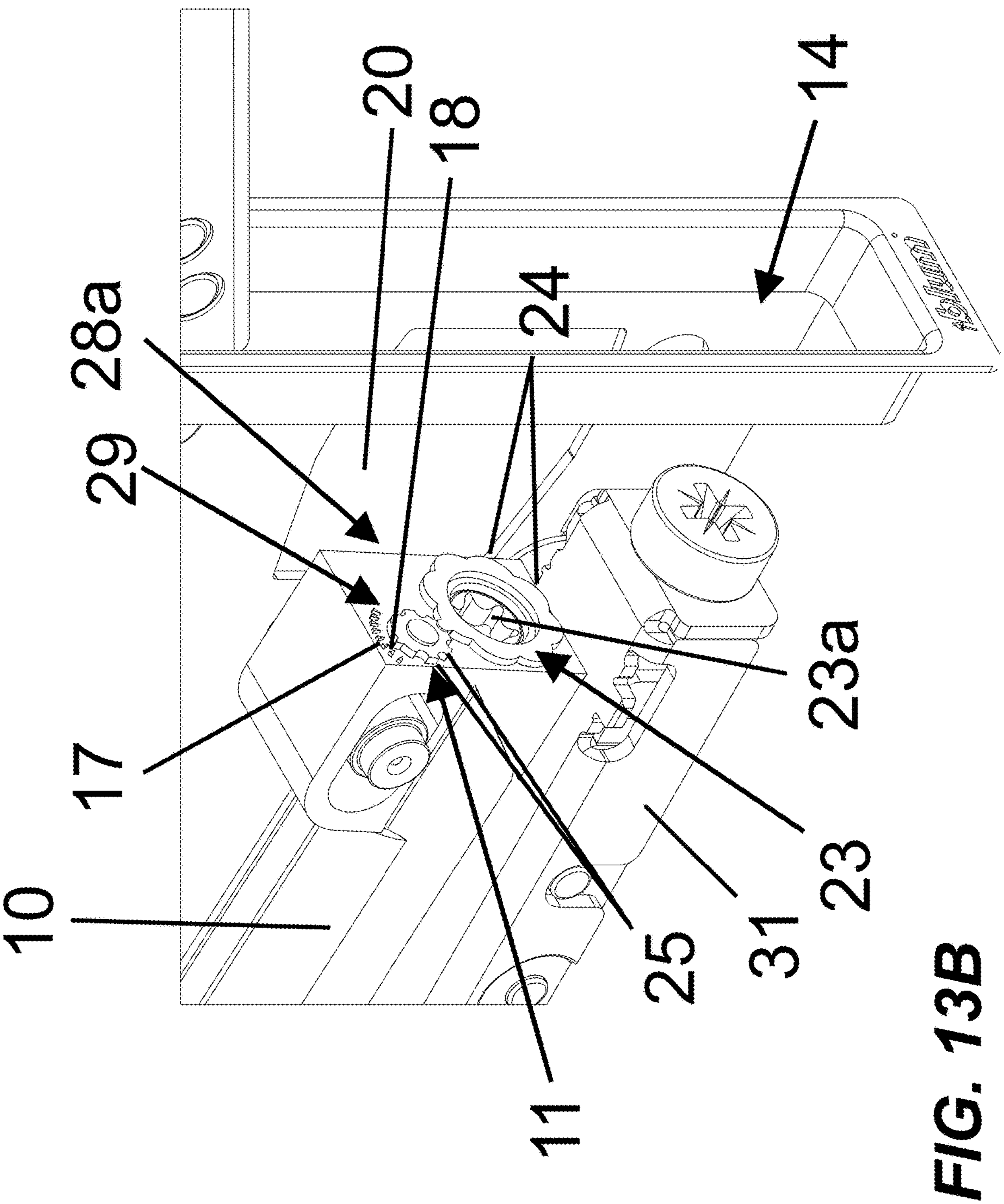
Figure 13C:
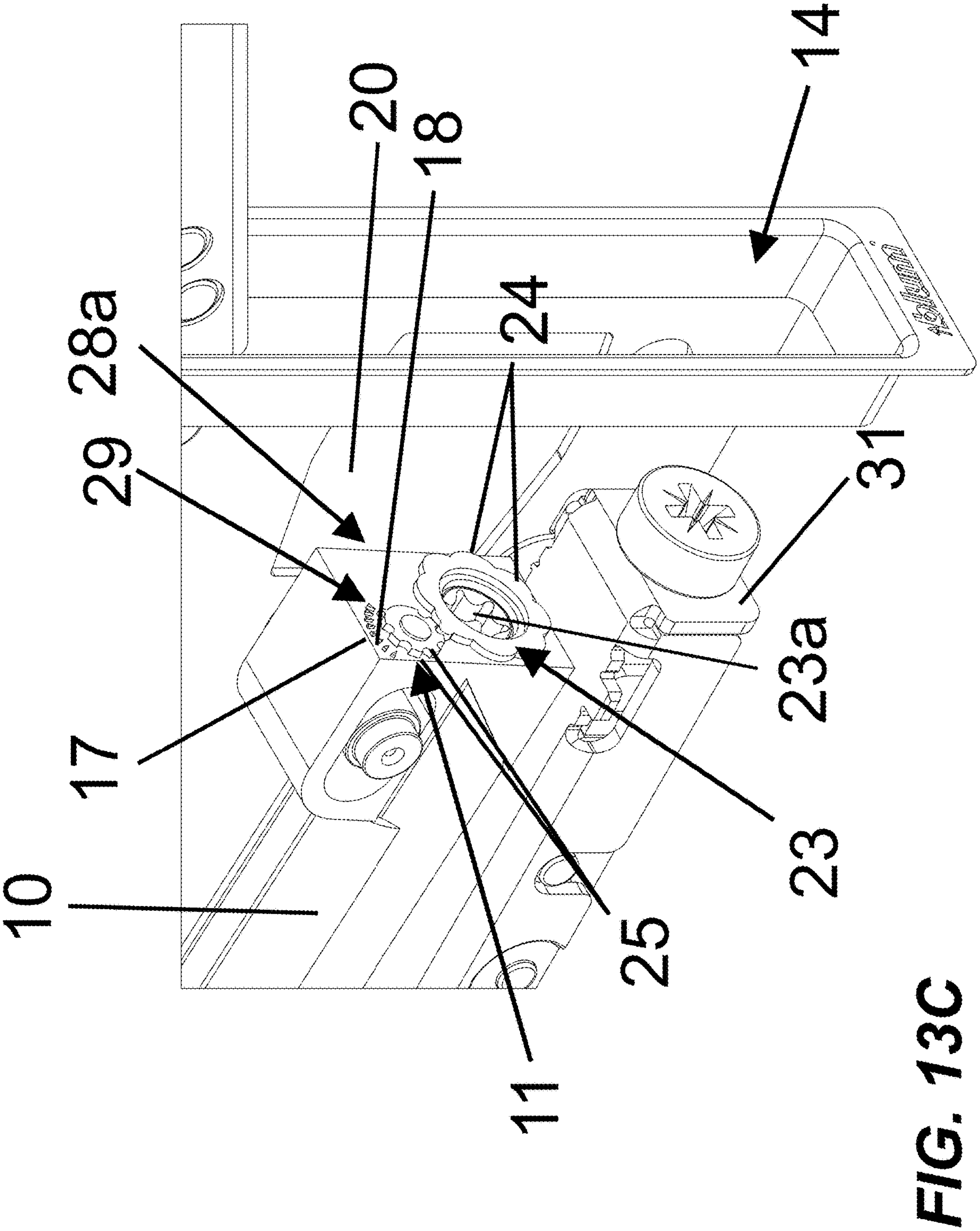

FIG. 13*b* and FIG. 13*c* show the furniture drive 1 with installed display 11 in two relative positions 28*a*, 28*b* that are different from one another. The indicator 18 is present in the form of a disc with a receiver portion 25. A rotation of the indicator 18 is brought about by an interaction between the receiver portion 25 and the catch 24 of the display device.

Compared with FIG. 9, an altered transmission 29 has been installed. The transmission ratio between a force adjustment by the tool holder 23 via the tool holder 23*a* and the display via the indicator 18 on the scale 17 is generally as desired. A transmission ratio of at least 2:1 has proved to be particularly advantageous.

The indicator 18 is connected to the transmission 29 in a material-bonding manner.

Figure 14A:
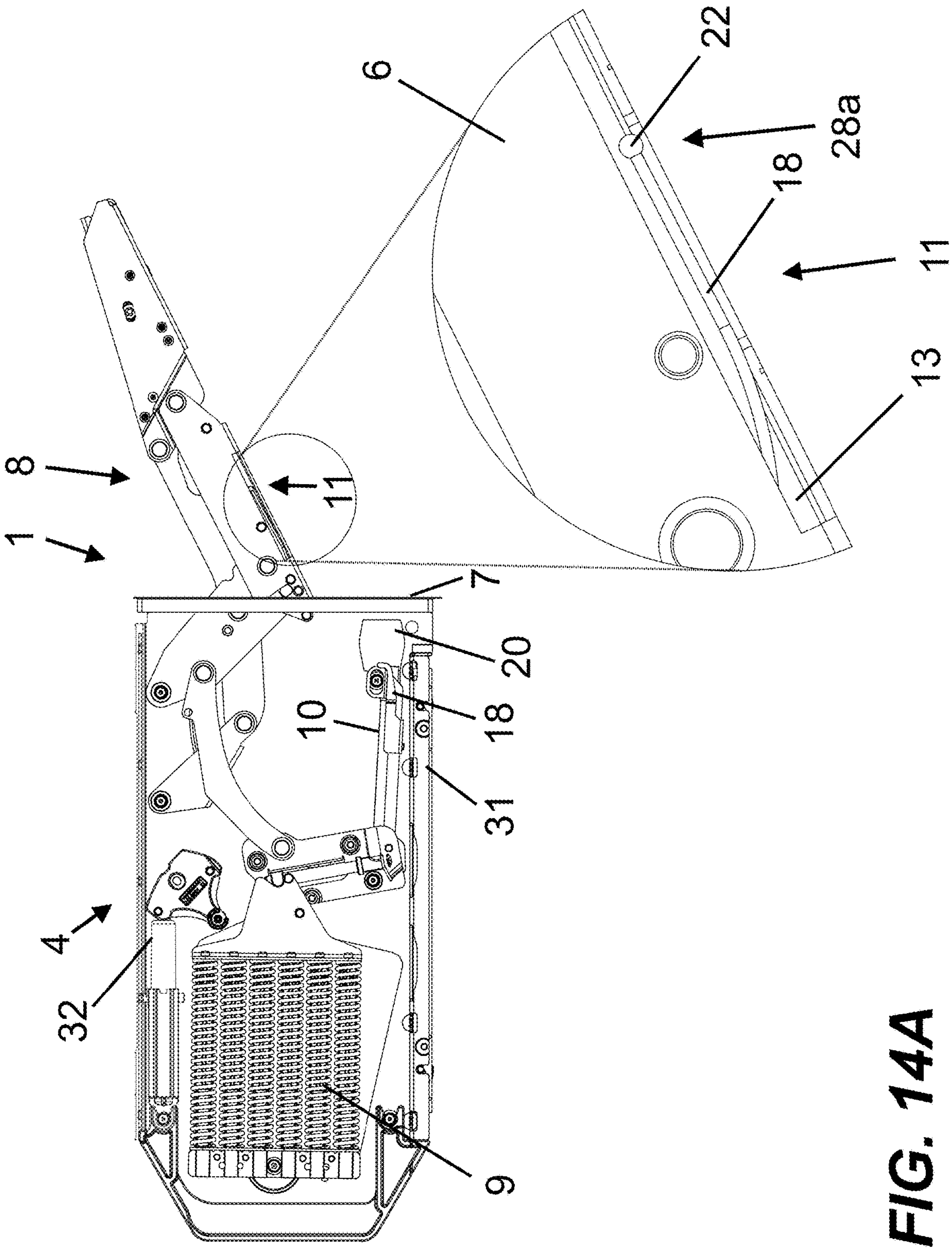
FIGS. 14*a*-14*c* shows a furniture drive according to a further preferred embodiment with a dismantled side face in a view from the side and a perspective view with an enlarged detail section of the display n two relative positions.

FIG. 14*a* shows a furniture drive 1, wherein the display 11 is arranged at least partially on a region inside the actuating arm 6. The actuating arm 6 is arranged outside the housing 4 in the relative position 8 in which the actuating arm 6 protrudes through the end face 7 of the housing 4. For reasons of clarity, one side face 15 of the housing 4 has been dismantled.

In a detail view of the actuating arm 6, it can be seen that the actuating arm 6 has an actuating arm opening 13, wherein the display 11 can be read through the actuating arm opening 13 in the relative position 8 in which the actuating arm 6 protrudes through the end face 7 of the housing 4. The actuating arm opening 13 is arranged on both side faces of the actuating arm 6, as a result of which the force adjustment can be read via the display device 11 on both sides of the actuating arm 6 and can be used particularly advantageously in the case of pieces of furniture 26 in corners of a room.

The indicator 18 in the form of a wire 18*b* has a thickening 22 on a free end, wherein the indicator is arranged in a first relative position 28*a*.

Figure 14B:
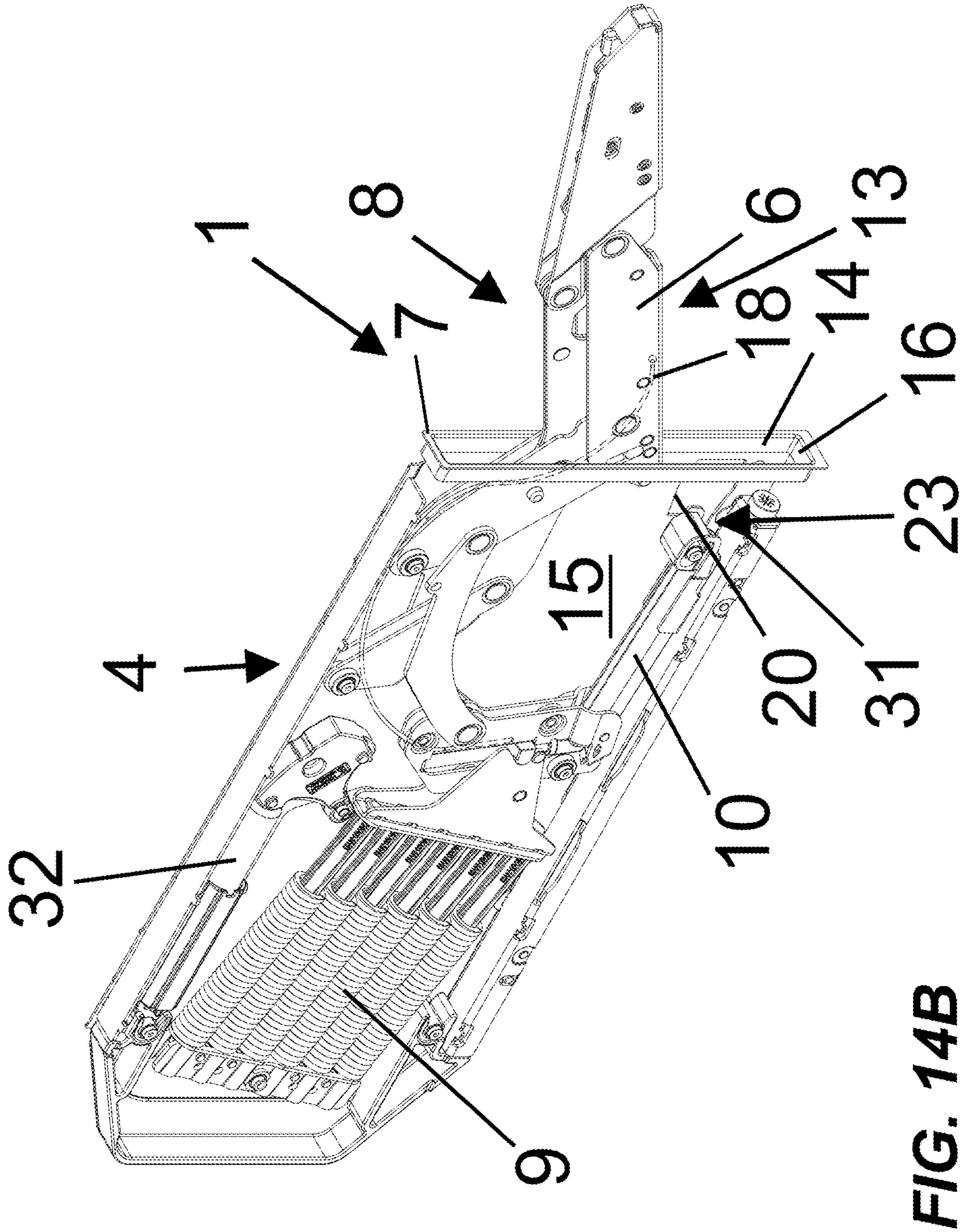

FIG. 14*b* differs from FIG. 14*a* only in the fact that the actuating arm opening 13 is arranged on an underside of the actuating arm 6, wherein in FIG. 14*a* the actuating arm opening 13 passes continuously through both side faces of the actuating arm 6. In general, the actuating arm opening 13 can also be arranged on only one side face or on both side faces and the underside of the actuating arm 6, in order to display the force adjustment for an operator via the display 11.

In general, a second display 11 can be provided, wherein, for example, on the adjustment bar 10, indicator 18 and/or a scale 17 is arranged on the housing opening 20.

Figure 14C:
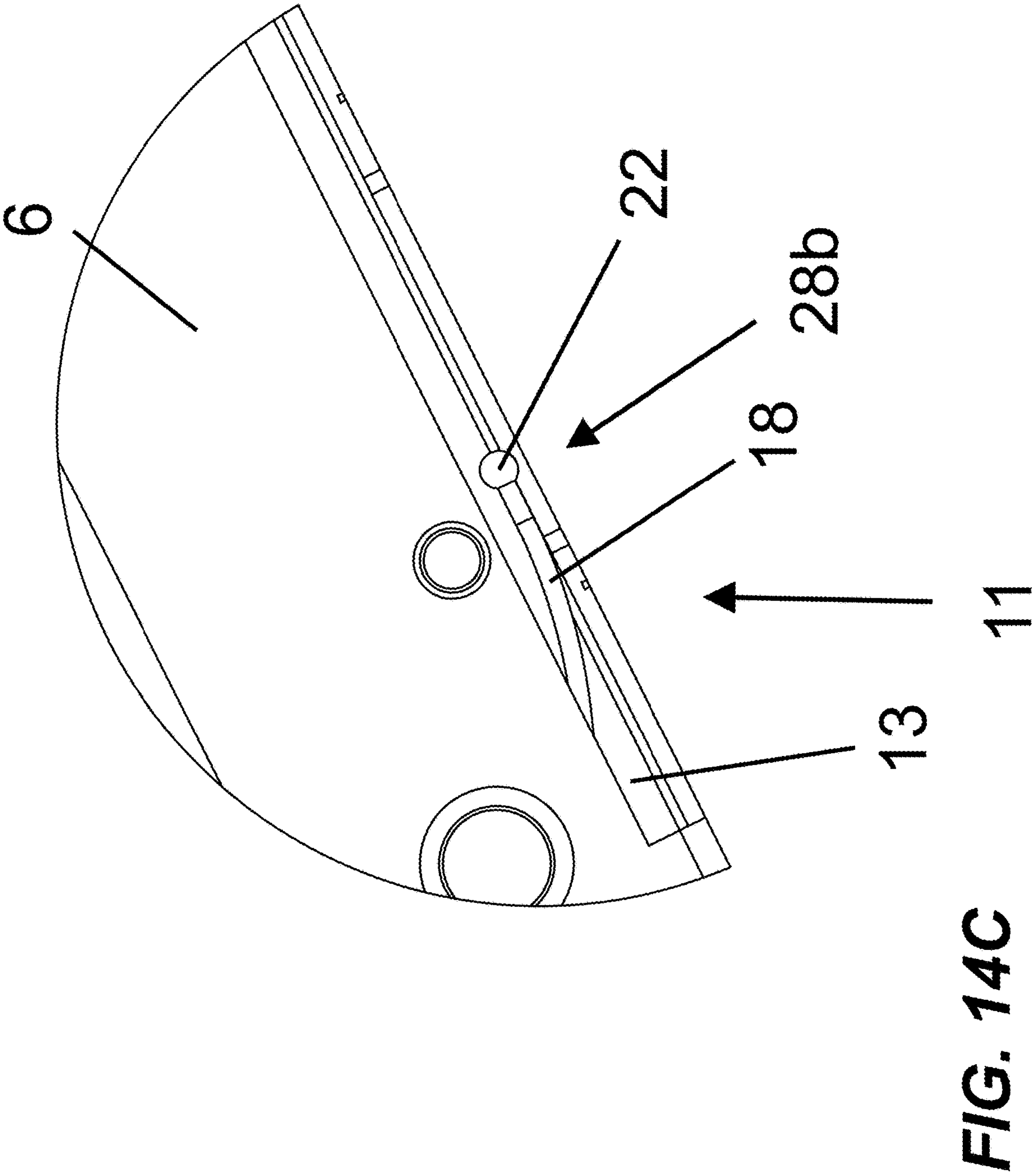

FIG. 14*c* shows the detail section of the display 11 in a further relative position 28*b*, wherein the force adjustment has been altered via the adjustment bar 10 compared with the relative position 28*a* shown in FIG. 14*a*.

Figure 15A:
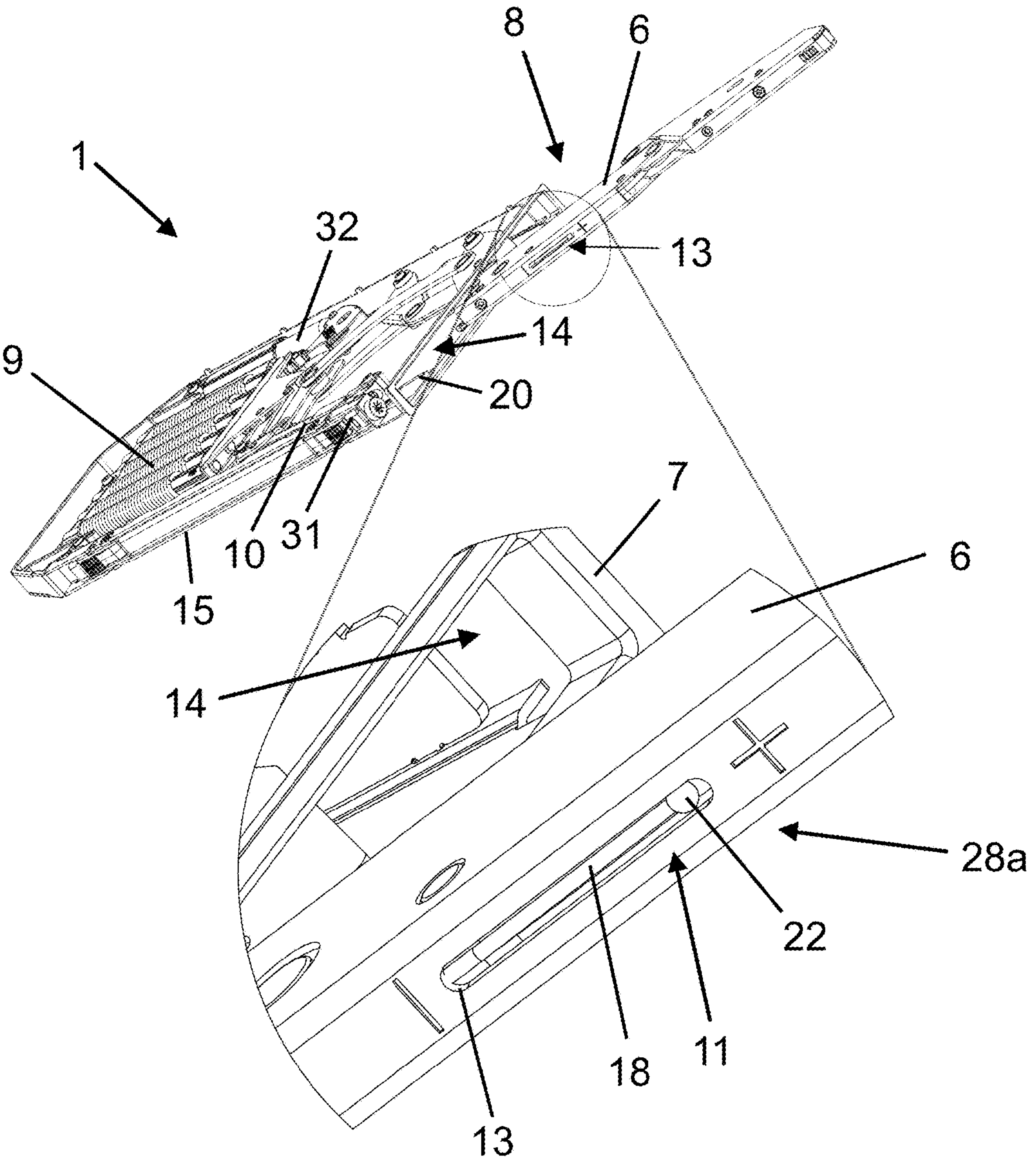
FIGS. 15*a*-15*b* shows the furniture drive of FIG. 14*a* in a perspective view with an enlarged detail section of the display device in two relative positions.

FIG. 15*a* shows a furniture drive, wherein the actuating arm opening 13 is arranged on an underside of the actuating arm 6, as a result of which it can be guaranteed that the force adjustment can be read particularly convenient via the display 11 by a user and/or installer, in particular in the case of furniture drives 1 arranged high on a piece of furniture 26.

In general, however, an actuating arm opening 13 can also be arranged on an upper side of the actuating arm 6, in order, in particular in the case of furniture drives 1 located deep in the piece of furniture 26, to make it possible to determine the force adjustment in a user-friendly manner.

In the enlarged detail section, it can be seen that the thickening 22 of the display 11 displays an increased force acting on the actuating arm 6 through the spring device 9 through the relative position 28*a*, in which the indicator 18 is located closer to a plus sign.

Figure 15B:
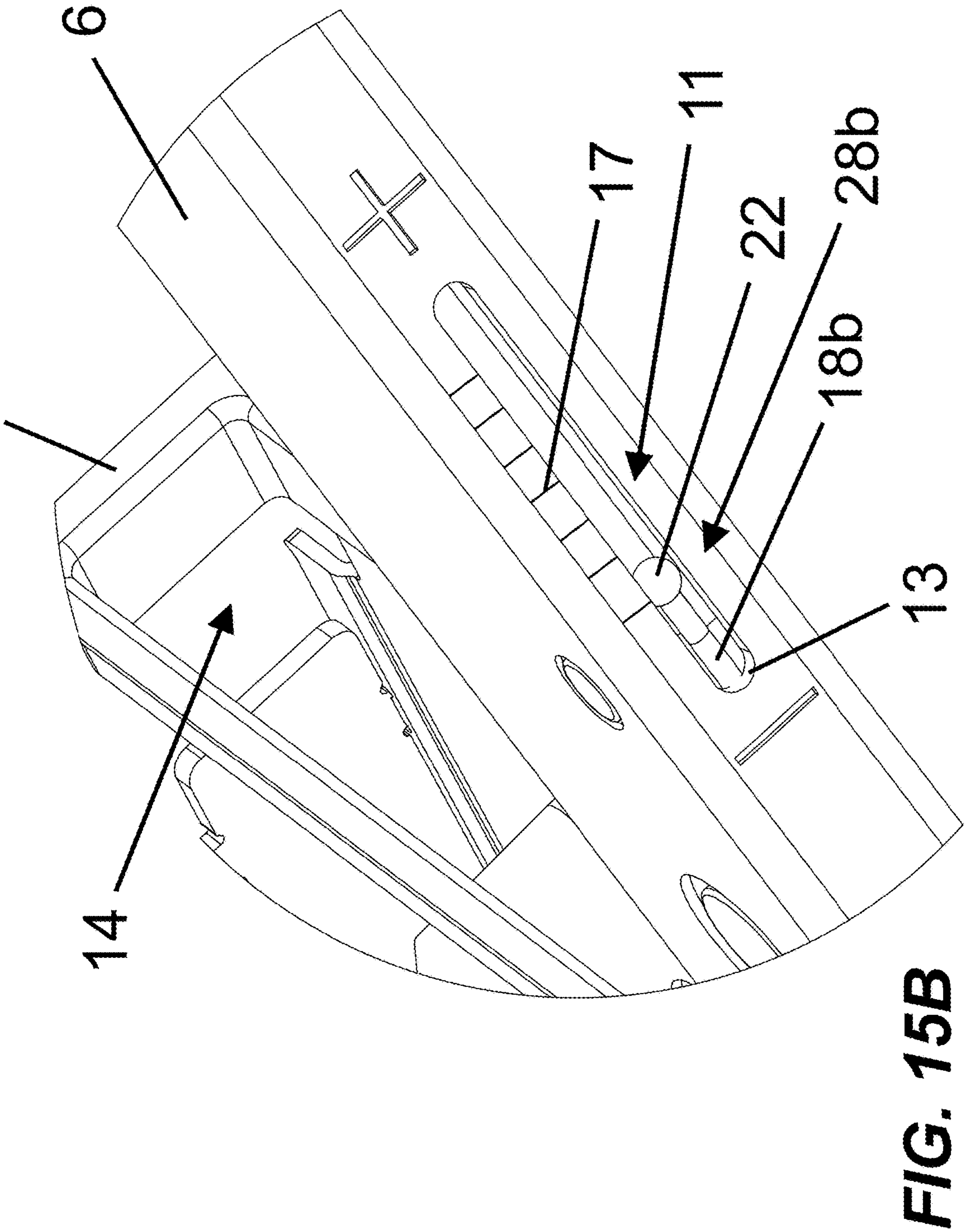

FIG. 15*b* differs from the detail section of FIG. 15*a* only in the fact that the indicator 18 is arranged on the actuating arm opening 13 in a further relative position 28*b* and, to simplify the determination of the force adjustment, an additional scale 17 is arranged on the underside of the actuating arm 6.

The indicator 18 is present in the form of a wire 18*b* with a thickening 22. In general, the wire 18*b* can comprise a Bowden cable, for example.

Figure 16A:
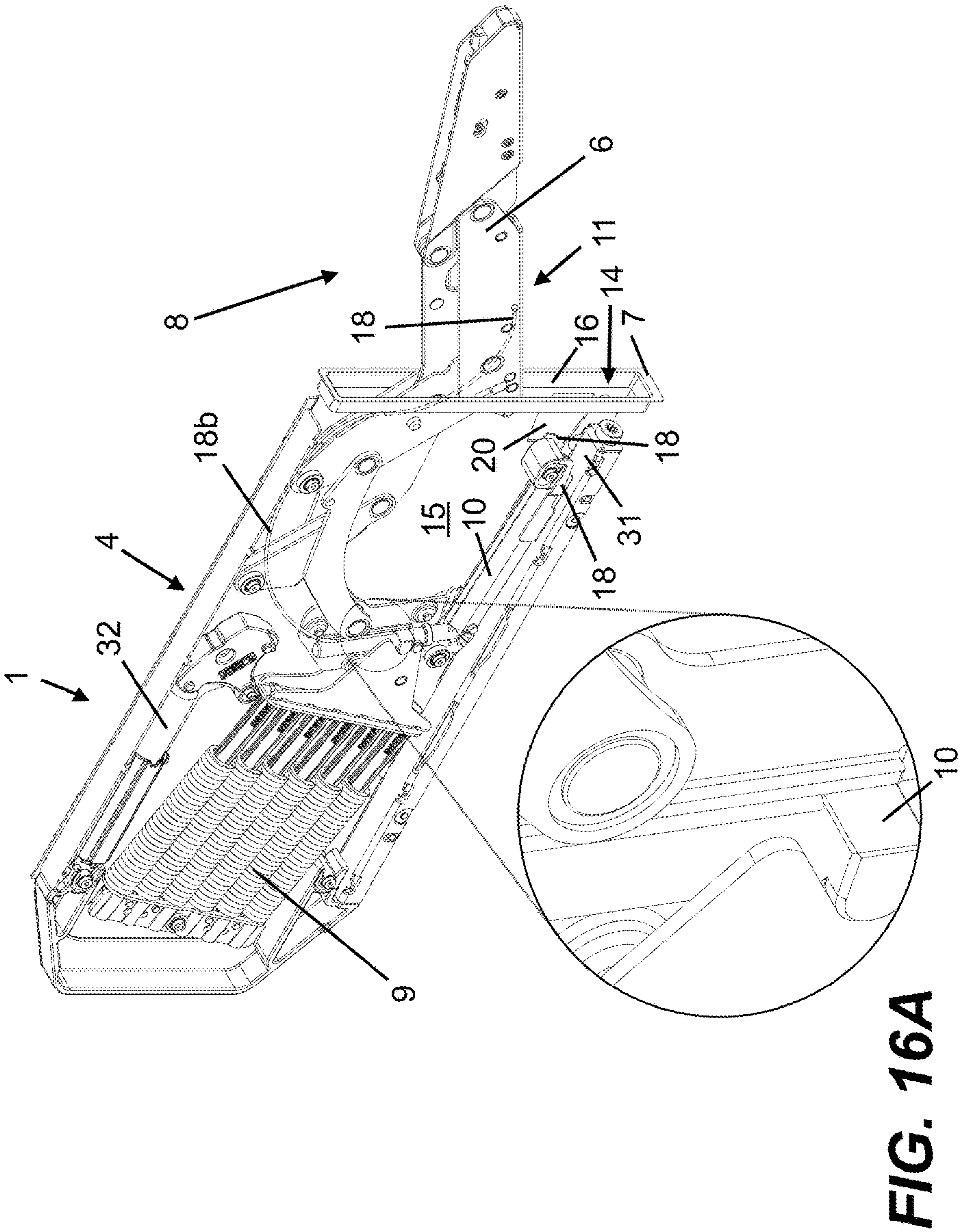
FIGS. 16*a*-16*c* shows the furniture drive of FIG. 14*a* with an enlarged detail section of the adjustment bar and two further enlarged detail sections of the display with and without a display located on the adjustment bar, in a perspective view.

FIG. 16*a* shows a furniture drive 1 with the actuating arm 6 mounted about an axis of rotation for moving the movable furniture part 3, the spring 9—arranged on spring holders—for applying force to the actuating arm 6 and a transmission mechanism—in the form of a lever system—for transmitting a force from the spring 9 to the actuating arm 6, wherein the transmission mechanism is arranged above a point of contact on the spring 9.

The point of contact is adjustable via an adjustment bar 10 for adjusting the position of the point of contact, wherein in the case of an altered point of contact, an altered torque acts on the actuating arm 6 for moving the movable furniture part 3 (not represented for reasons of clarity).

The adjustment bar 10 is arranged completely inside the housing 4, the transmission mechanism and the actuating arm 6 are arranged in it in regions. A display 11 that is separate from the adjustment bar 10 is provided, wherein the force adjustment of the actuating arm 6 via the position of the point of contact of the spring device 9 can be read via the display 11.

A scale 17 is arranged on the underside of the actuating arm 6 (not visible in the representation). In general, the scale 17 can also be dispensed with, wherein the force adjustment of the actuating arm 6 is displayed by a relative positioning of the indicator 18 in relation to the actuating arm 6 or the actuating arm opening 13 located on the underside of the actuating arm 6, wherein the indicator 18 is visible through the actuating arm opening 13.

The display 11 comprises an indicator 18 arranged within the actuating arm 6 in regions.

Figure 16B:
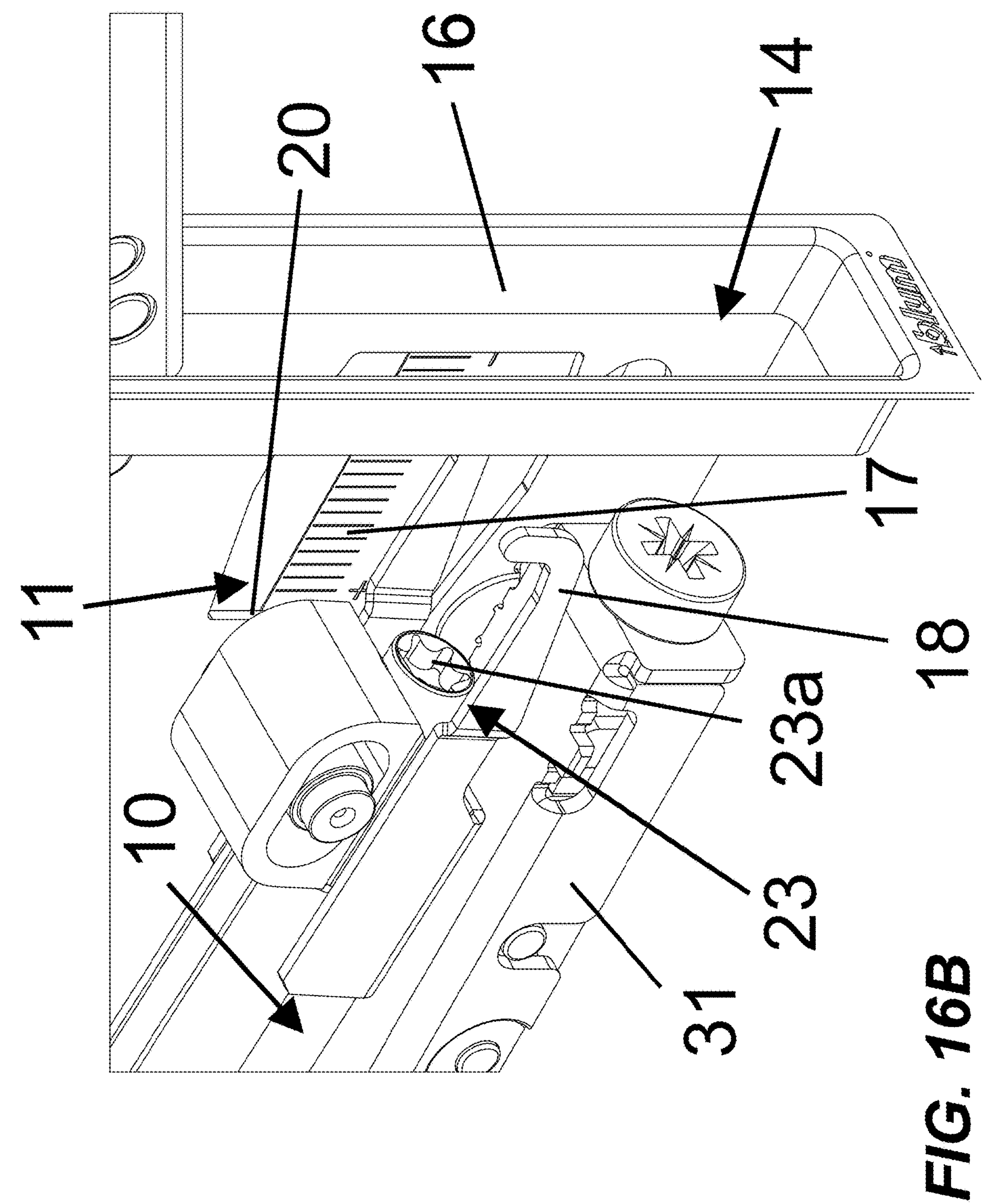

FIG. 16*b* shows the furniture drive 1 according to FIG. 16*a*, wherein in addition to the indicator 18 arranged on the adjustment bar 10, a film 19 with a scale 17 is arranged on the housing 4, in order to bring about a more convenient display of the force adjustment for the operator and/or installer of the furniture drive 1 through a further display 11.

Figure 16C:
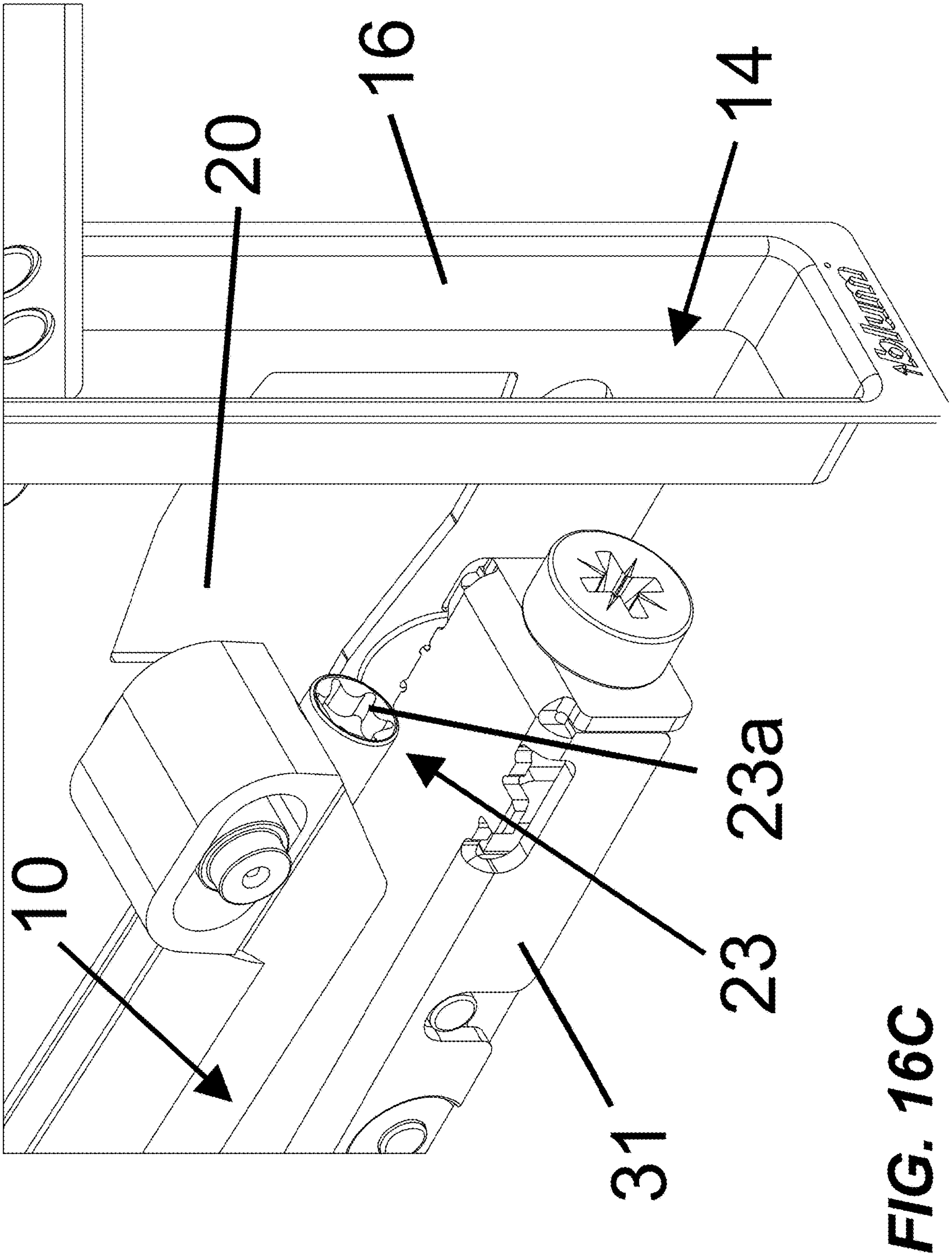

FIG. 16*c* shows the furniture drive 1 according to FIG. 16*a* without an indicator 18 arranged on the adjustment bar 10, wherein the display of the force adjustment is effected exclusively via the display 11 arranged on the actuating arm 6.

The invention claimed is:

1. A furniture drive for moving a furniture part mounted movably relative to a furniture body, the furniture drive comprising:
- a housing to be mounted to a furniture panel of the furniture body;
- an actuating arm mounted movably relative to the housing and on which the movable furniture part is to be fastened, wherein the housing has an end face through which the actuating arm protrudes in at least one relative position;
- a spring configured to exert a force on the actuating arm,
- an adjustment bar configured to adjust the force to be exerted on the actuating arm by the spring; and
- a display including an indicator and measurement symbols, the indicator being configured to move relative to at least a portion of the measurement symbols to display a force adjustment by the adjustment bar, the measurement symbols including at least one of a group including (i) a scale and (ii) a marking,
- wherein the display is readable in an installed position of the furniture drive, and the housing to be arranged completely, except for the end face, within the furniture panel of the furniture body in the installed position, and
- wherein the housing comprises a side face, the measurement symbols being arranged on the side face so as to face towards an interior of the housing and the adjustment bar.

2. The furniture drive according to claim 1, wherein the display is configured to be read in the installed position of the furniture drive at least in the relative position in which the actuating arm protrudes through the end face of the housing.

3. The furniture drive according to claim 1, wherein the end face of the housing has an opening, and the display is located at least partially in the interior of the housing so as to be read by looking through the opening into the interior of the housing.

4. The furniture drive according to claim 1, wherein the housing, the display, and the adjustment bar are configured to have at least one of the following configurations:
- (i) the housing has two side faces spaced apart from one another, the two side faces being arranged parallel to one another and transversely relative to the end face of the housing, and the display being arranged at least partially between the two side faces; and
- (ii) the display is arranged at least partially on the adjustment bar.

5. The furniture drive according to claim 1, wherein the scale is arranged on the side face of the housing so as to face towards the interior of the housing, and the indicator is movable relative to the scale.

6. The furniture drive according to claim 5, wherein the scale is arranged on a film applied to the side face.

7. The furniture drive according to claim 5, wherein the indicator has at least one of the following configurations:
- (i) the indicator is formed of a metal sheet or a wire; and
- (ii) the indicator is movable in a linear or rotatable manner.

8. The furniture drive according to claim 1, wherein the adjustment bar comprises a tool holder, wherein the adjustment of the force to be exerted on the actuating arm by the spring is adjustable via the tool holder.

9. A piece of furniture comprising:
- a furniture body;
- a furniture part mounted movably relative to the furniture body; and
- the furniture drive according to claim 1,
- wherein the furniture body has a vertically arranged furniture panel, and the housing of the furniture drive is mounted to the furniture panel, and
- wherein the furniture part is fastened to the actuating arm of the furniture drive, the furniture part is movable relative to the furniture body by the furniture drive, and the housing of the furniture drive is arranged completely, except for the end face, in the furniture panel of the furniture body.

10. The piece of furniture of claim 9, wherein the furniture part mounted movably relative to the furniture body is a furniture flap pivotable about a horizontal axis relative to the furniture body.

11. The furniture drive according to claim 4, wherein the housing, the display, and the adjustment bar are configured to have both of the following configurations:
- (i) the housing has two side faces spaced apart from one another, the two side faces being arranged parallel to one another and transversely relative to the end face of the housing, and the display being arranged at least partially between the two side faces; and
- (ii) the display is arranged at least partially on the adjustment bar, and
- wherein the display is arranged on a side of the adjustment bar facing the end face between the end face and the adjustment bar.

12. The furniture drive according to claim 5, wherein the display further comprises at least one of the following configurations:
- (i) the scale is engraved into the side face of the housing or glued onto the side face of the housing; and
- (ii) the indicator is movable relative to the scale when the force to be exerted on the actuating arm by the spring is adjusted; and
- (iii) the adjustment of the force to be exerted on the actuating arm by the spring is readable from a position of the indicator relative to the scale.

13. The furniture drive according to claim 6, wherein the housing has a housing opening on a side face to which the film is affixed, the scale being arranged on a side of the film facing the adjustment bar.

14. The furniture drive according to claim 1, wherein the indicator is arranged between two side faces in the interior of the housing.

15. The furniture drive according to claim 5, wherein the scale is engraved into the side face of the housing or glued onto the side face of the housing.

* * * * *